May 26, 1970 J. H. LEMELSON 3,513,993

AUTOMATIC STORAGE APPARATUS

Original Filed Aug. 13, 1962 8 Sheets-Sheet 1

INVENTOR.
Jerome H. Lemelson
BY
Baldwin, Egan, Walling & Fetzer
ATTORNEYS

INVENTOR.
Jerome H.Lemelson
BY
Baldwin, Egan, Walling & Fetzer
ATTORNEYS

AUTOMATIC STORAGE APPARATUS

Original Filed Aug. 13, 1962 8 Sheets-Sheet 3

INVENTOR.
Jerome H. Lemelson
BY
Baldwin, Egan, Walling & Fetzer
ATTORNEYS

AUTOMATIC STORAGE APPARATUS

Original Filed Aug. 13, 1962 8 Sheets-Sheet 4

INVENTOR.
Jerome H. Lemelson
BY
Baldwin, Egan, Walling & Fetzer
ATTORNEYS

INVENTOR.
Jerome H. Lemelson
BY
Baldwin, Egan, Walling & Fetzer
ATTORNEYS

INVENTOR.
Jerome H. Lemelson
BY
Baldwin, Egan, Walling & Fetzer
ATTORNEYS

AUTOMATIC STORAGE APPARATUS

Original Filed Aug. 13, 1962

INVENTOR.
Jerome H. Lemelson
BY
Baldwin, Egan, Walling & Fetzer
ATTORNEYS

AUTOMATIC STORAGE APPARATUS

Original Filed Aug. 13, 1962 8 Sheets-Sheet 8

INVENTOR.
JEROME H. LEMELSON
BY
Baldwin, Egan, Walling & Fetzer
ATTORNEYS

United States Patent Office 3,513,993
Patented May 26, 1970

3,513,993
AUTOMATIC STORAGE APPARATUS

Jerome H. Lemelson, Metuchen, N.J., assignor to The Triax Company, Cleveland, Ohio, a corporation of Ohio Application June 30, 1965, Ser. No. 468,532, which is a continuation of application Ser. No. 219,357, Aug. 13, 1962. Divided and this application July 9, 1968, Ser. No. 743,418
The portion of the term of the patent subsequent to Aug. 14, 1979, has been disclaimed
Int. Cl. B65g *1/00*
U.S. Cl. 214—16.4 3 Claims

ABSTRACT OF THE DISCLOSURE

An automatic load handling system comprising a storage rack having a plurality of storage volumes and a powered load carrier movable alongside the storage rack for depositing loads into and removing loads from the storage rack. The load carrier is actuated by electrical power means in circuit with control means, the latter being operable to cause the load carrier to move sequentially to two selected storage volumes in the storage rack, and from a pick up station where the load carrier picks up a load and then deposits the load at the first storage volume in the storage rack, and then the load carrier moves to the second selected storage volume to pick up a load already on deposit in the storage rack.

This application is a division application of my co-pending application, Ser. No. 468,532, filed June 30, 1965 for Automatic Storage Apparatus, which in turn is a continuation of my co-pending application Ser. No. 219,357, filed Aug. 13, 1962 for Automatic Storage Apparatus (now abandoned) which in turn was a continuation-in-part application of U.S. Ser. No. 577,415, filed Apr. 10, 1956 and issued Aug. 14, 1962 as U.S. Pat. 3,049,247, which in turn was a continuation-in-part application of U.S. patent application Ser. No. 449,874, filed July 28, 1954 (now abandoned).

Apparatus for storing and automatically conveying from storage work-in-process and finished goods has been heretofore developed and generally comprises systems employing chutes or gravity conveyors having gates for the control of flow. Systems employing such apparatus have a number of inherent shortcomings and are limited to the storage of small, packaged or boxed goods which will not be damaged or break open when they are delivered down a chute. A further limitation of a chute delivery system results from the fact that conveyor chutes must be kept in constant attendance and are generally capable of being loaded only by manual or lift truck means.

Gravity feeding storage systems per se are not satisfactory for handling large, bulky and irregularly shaped objects or for the conveyance of a multitude of irregularly shaped, small objects. Such systems are also inflexible since the objects being stored and delivered must be capable of being stacked on the chute or conveyor in an orderly, tandem array one behind the other without interlocking, or otherwise being retained together so that they may be counted and dispensed automatically and controlled in their movement whereby their motion may be stopped when a desired number has been dispensed.

The apparatus of this invention solves many of the above mentioned shortcomings of gravity chute storage systems and also provides improved automatically operating apparatus which may be used for simultaneously handling bulk material, work-in process and finished goods and storing these on predetermined storage racks or chutes in a system not requiring manual attendance. The automatic storing apparatus of this invention also provides the function of retrieving or conveying out-of-storage the articles or material carried thereby to storage. It may also be operated to coact with similar apparatus which retrieves articles stored thereby.

The automatic controls and conveying apparatus provided herein may be utilized to automatically transport a variety of different objects, large or small, from any predetermined position therein. This is accomplished without changing the attitude of the load so that pallets, racks or open boxes may be employed as means for temporarily holding a large number of objects or bulk material containers. As a result bulk materials may be rapidly transported from storage and automatically dumped or unloaded where needed. Whereas the chutes or conveyors of the mentioned conventional automatic gravity feed storage systems are each designed and shaped to handle a single type or shape of item, the system and apparatus presented herein are flexible in that the apparatus is not limited to the transfer of my specific shape of item.

It is accordingly a primary object of this invention to provide a new and improved apparatus for the automatic storage and removal from storage of materials, work-in-process or finished goods.

Another object of this invention is to provide means for removing from storage a palletized load or the like and for transferring them to a conveyor without the need for different fixtures or materials handling devices particularly designed for the shape of the product or object stored.

Another object of this invention is to provide an automatic materials handling system for the automatic and unattended transfer of objects or materials which are palletized or boxed and their storage in depth as well as in height.

It is another object of this invention to provide new and improved automatic conveying apparatus including a carrier for the automatic transfer of work or material in process or finished goods from a first position in a given volume to a second position herein including automatic means of loading said work thereon and discharging it therefrom.

Another object is to provide in combination with an automatic warehousing carrier which is employed to store and retrieve articles relative to storage racking, an automatic means for controlling a materials handling device projectable from said carrier and preventing its movement into a storage location already occupied by an article so as to prevent damage to both device and the article.

Another object is to provide an improved system for identifying articles or loads travelling on a conveyor and controlling the routing thereof through an automatic handling system by scanning predetermined areas of the articles.

These and other objects and advantages will become more apparent from reference to the following description taken in connection with the accompanying drawings, in which:

FIG. 9 is a diagram showing further details of a control-recorder provided in FIG. 9;

FIG. 19 shows the carrier of FIG. 18 in position for disposing an article onto a moving conveyor; while

GENERAL SYSTEM ARRANGEMENT

Figure 1:
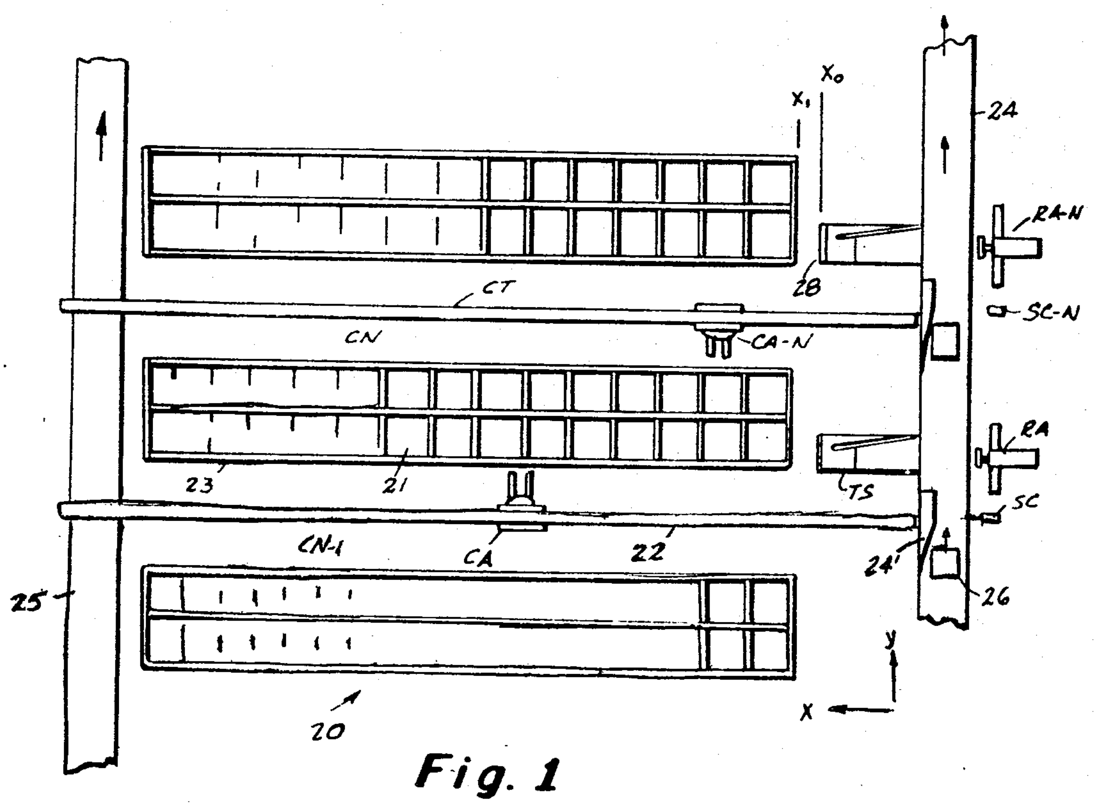
FIG. 1 is a partial plan view of an automatic storage or warehousing system employing multiple tiers of storage racks, belt conveyors and guided carriers movable to service said racks and conveyors.

In a preferred form, the improved automatic storage system of my invention employs a plurality of conveyors for transferring palletized or boxed loads into selected volumes or storage positions in a storage area or warehouse. Products, work-in-process, boxed or palletized loads move on an in-flow conveyor such as a continuously moving belt conveyor which travels adjacent the storage area. Means are provided for identifying said pallets or loads and transferring them to selected first temporary storage platforms or chutes, a plurality of which are provided adjacent the in-flow conveyor at different locations.

Each temporary storage platform is provided adjacent an aisle. A respective track travelling carrier services each aisle. Each carrier is power operated to permit it to pick-up a load or pallet from the temporary storage platforms and travel with said load to a selected or predetermined position along the aisle. The carrier is controlled in its motion by electrical predetermined controllers and sequential controlers which are programmed or preset by signals derived from either scanning code marks on the load or from a remote manual or automatic code generating means.

Situated on either or both sides of each aisle serviced by a carrier are storage racks or shelves which define different storage levels on each of which and at each storage location may be stored one or more of said conveyed loads. In the act of storing, a predetermining controller mounted on the carrier is programmed or preset by signals derived from scanning the product to be stored or from a remote control console. This controller is operative, once the carrier has picked up a load from the temporary discharge chute to control the carrier to travel a predetermined position along its track whereby it is in alignment with a predetermined storage position as defined by a particular shelf or tier of the storage racking and a predetermined distance along said track from said temporary storage chute. Determination by the controller of the distance travelled is effected by scanning markers or other means as the carrier travels, which results in the generation of pulses with predetermined movement of the carrier.

The said predetermining controller is also effective in controlling the vertical travel of a work handling fixture on the carrier which thereafter lifts the load to a predetremined storage level. At such a level a storage sequential controller is energized which controls further movement of the fixture in a path for effecting the transfer of the work held thereby onto the rack storage position thereopposite. The carrier is thereafter automatically operated to return to a homing position or controlled by means of a recorded command signal to either return to said temporary discharge conveyor or operate in a manner to remove an already stored load from its storage position and transfer it to said outgoing conveyor.

The carrier is thus controlled by a plurality of predetermining controllers which are preset by coded signals or command messages generated from a control console by manual or recorded input or by scanning the product or pallet containing the load. Said controllers are effective in prepositioning the carrier and the carrier work handling fixture in alignment with a predetermined storage position in the racking serviced thereby, which predetermining controllers are also effective in energizing a selected of a plurality of preset sequential controllers at the proper instant. Three of such preset sequential controllers are provided, one for controlling the motion of the fixture in the act of lifting and removing a load positioned thereopposite on either said temporary storage chute or on the storage racking, another for controlling the motion of the fixture in the act of depositing a load held by the fixture in the storage racking and a third for discharging a load held by the fixture onto the out-going conveyors for transfer to shipping or a manufacturing area.

Figure 2:
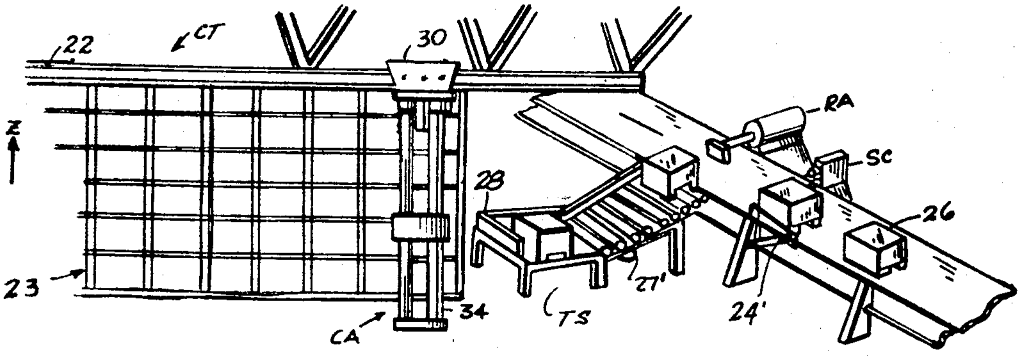
FIG. 2 is an isometric view of a discharge station and part of a tier of racking appearing in FIG. 1.

Elements of a typical automatic storage and dispensing system according to the present invention are illustrated in FIGS. 1 and 2 which comprise:

STORAGE VOLUME

A storage volume 20 is provided which may comprise, for example, an entire floor and the space thereabove, a warehouse or an area located at the end of or adjacent to a production area. Situated within said storage volume is an orderly arrangement of storage means 23 comprising shelves, racking or tiers of roller conveyors on which palletized or boxed loads may be stored. These comprise, in the arrangement of FIG. 1, racking means 23 defining separate storage volumes in which boxed, packaged or palletized products may be automatically stored by materials handling apparatus accessible thereto on a trackway 22. The racking 23 is arranged so that the unit storage bays 21 extend in rows adjacent to corridors CN, CN–1, etc., which bays are tiered vertically and extend as many bays deep as said conveying apparatus will reach. For the purposes of simplifying this discussion, the direction parallel to the corridors C between bays will be referred to as the X direction, perpendicular thereto in a horizontal plane will be referred to as the Y direction and all vertical directions will be referred to as the Z direction. Thus any unit volume or bay may be referenced for purposes of special designation and control by an X, a Y and a Z coordinate.

TRANSFER CONVEYOR

Extending along each corridor is a conveyor trackway CT. Riding on and adapted to travel said trackway is an individual self-propelled carrier and work holding fixture CA which comprises a monorail travelling conveyor having a vertical trackway mounted thereon with a work holding fixture 37, adapted to vertically transfer the work to or from any individual storage bay 21. In FIG. 1 and in the system to be described, each conveyor trackway CT–1, CT–2 . . . CT–N is provided with a work holding fixture in the form of a self-propelled carrier CA–1 . . . CA–N. It is noted that the system of FIG. 1 may also be designed having known monorail switching devices for the transfer of any work holding fixtures or carirer CA from one to another of a network of such conveyor trackways.

FIG. 1 shows a first belt conveyor 24 running along one side of said storage area 20 in the Y direction for the continuous flow of "palletized" work into the storage area 20 and a second belt conveyor 25 extending in the Y direction at the other end of the corridors C which may be utilized for the flow of material deposited thereon by said carriers CA out of said storage area. It is noted that at least one of these continuously flowing belt conveyors 24, 25 may be utilized and positioned along any logical route in the system depending on the size, extent and design of the layout of the conveyor trackways CT. The belt conveyor 24, 25 may comprise any type of uni-directional continuous conveyor on which pallets, boxes or work, or products may travel. The work-in-process or finished goods will hereinafter be referred to as palletized work whether it be provided per se, boxed, or otherwise packaged or mounted on a fixture.

TRANSFER INTO STORAGE

In the system illustrated, each pallet is provided with an optical identification means in the form of a card having markings which are scanned by photoelectric reading devices positioned adjacent the conveyors 24 and 25 for routing control. The photoelectric readers transmit signals derived by scanning each card as the pallet moves past to control transfer apparatus positioned in alignment with each storage aisle or corridor and to a transfer carrier CA adapted for travelling along said corridors to effect the routing and transfer of said pallet to a predetermined storage volume or storage bay. In order to handle a large number of pallets 26 when, for example, they are closely positioned on the incoming belt conveyor 24, one behind the other, a temporary storage area TS is provided at each corridor C into which pallets destined for storage in selected of the bays adajacent said corridor are selectively pushed or otherwise transferred from the incoming belt conveyor 24 and may be held thereon while awaiting further transfer by the carrier CA to a predetermined storage bay. The temporary storage area TS may be fed by a roller gravity chute or powered conveyor 27 which is so positioned that the pallet may be transferred off conveyor 24 by an electrical or air operated ram transfer device RA and will travel to the end of 27. A stop 28 is provided at the end of conveyor 27 so that the pallet at the end of its travel thereon is prepositioned to be picked up by said carrier CA. Then the endmost pallet on 27 is removed therefrom, the pallet immediately behind it will be moved by gravity or powered means on 27 to the end thereof where it will be in a position to be next transferred when carrier CA returns thereto. Notation 28 refers to a stop at the end of 27.

The photoelectric scanning device SC is provided adjacent conveyor 24 in a position relative to the temporary storage conveyor 27 to permit it to function to scan and determine if a passing pallet is to be transferred to the associated corridor discharge conveyor, and to thereafter effect such transfer.

TRANSFER FROM STORAGE

Removal of a pallet or product from a preselected storage bay in the system may be effected by remote selection means by the transmission of a control signal or command message to a receiver mounted on the work holding fixture or carrier CA where it is either stored or utilized immediately to control the motion of the carrier and the fixture forks to a position opposite a preselected bay or storage position. The command signal also controls further action of the forks in advancing, lifting and removing the pallet or product therefrom. The signals may be transmitted over the carrier power lines 32 or via short wave or radio means. By the use of conventional coded relay operated switches throughout the system, only a selected one of the total carrier receiver in the system will receive each command signal, pulse train or message transmitted on a common carrier or channel. Each command mesage or signal may be transmitted as a pulse train or code which may be utilized after receipt by a carrier to setup in relay storage a sequential switching control means such as a plurality of predetermining counters which thereafter are effective in controlling the motion of the servo motors driving the carrier and forks by utilizing, for example, position indication feedback pulses derived from a limit switch or photoelectric cell mounted on the work holding carrier which becomes energized each time the carrier CA or forks pass a predetermined section of the trackway 22 or storage racking 23. In the control system to be described, a storage device in the form of a magnetic storage drum is utilized to store a plurality of control positional command signals at each carrier so that each may thereafter be reproduced in the order of receipt and may respectively be utilized to control the motion of the carrier in the act of storing or removing objects or material from the storage area 20 accessible by said carrier. Command signal storage may also be effected at the transmitter or master control which signals may be sequentially reproduced and transmitted therefrom to each carrier for control. The stored message comprises a train of pulses including a first portion of the total signal which effective in completing a circuit between the receiver at the selected carrier and said transmitter. A control message for effecting the removal of a selected product or pallet from a known position in the storage area may also be generated by manual dial switching means, punch cards, or other means.

A typical command signal or message may consist of a number of short pulse trains, each of which is adapted to effect control of the following movements by actuating controls and relays, and by presetting predetermining counters and controllers.

CONTROL MESSAGE COMPOSITION (a) The initial part of each message contains a specific tone signal or pulse code which is transmitted by short wave or over the common overhead carrier lines 32 to all receivers and is effective in energizing a gate or switch at only one of said receivers to pass the rest of the control message therefollowing to a storage means and/or further control apparatus. A self-resetting relay at the input side of each carrier receiver is code operated or responsive to only one of a plurality of initial signals or specific pulse code so that the message therefollowing will be passed to only one carrier controller in the system. The remainder of the command message is then placed in relay storage or otherwise recorded and selectively read out in the order of its receipt to control and effect the motion of the carrier CA, the fork carriage 37 up and down track 34 thereof, the advancement of the forks 41, and fork retraction by controlling the operation of the motors MX, MY, MZ, driving said carrier, fixture and forks.

(b) Parts of each control message is thus separated from the remainder of the mesage pulse train and is used to preset a controller for controlling the motion of the carrier along the track 22 by controlling the operation of the carrier drive motor in accordance with feedback signals generated as the carrier moves along the track which indicate the realtive motion of the carrier.

(c) Another portion of the command message is used to preset a controller for controlling the motion of the vertically travelling carriage 37 whereby the forks thereof attain the height-position of a predetermined storage bay into which a pallet is to be stored or from which a pallet is to be removed.

(d) Still other parts of the command messages are used to preset or energize other automatic control devices which will be described for effecting automatic movement of the forks in removing or storing a pallet.

FIG. 2 shows part of a typical storage station in a system such as illustrated in part in FIG. 1 and also shows carrier CA and part of the storage racking. Pallets 26 of the product to be stored are moved along the conveyor 24 at a constant speed and are scanned by the photoelectric scanners SC located at each station which detect if each passing pallet contains a load which is destined for a particular bay of the storage racking in the aisle aligned with the scanner and actuate the ram transfer device RA which is effective in pushing the pallet 26 off conveyor 24 onto a bracket chute 27 where it moves down a roller conveyor 27' to the end of the chute TS and awaits removal therefrom by the carrier CA. The chute 27 is designed so that when a first product unit 26 is removed by the forks of the carrier CA, if there is another pallet immediately behind it, it will slide, or otherwise be transferred into the position of the removed unit and will be thus positioned for removal by the forks of the carrier when it returns, such that said forks may be advanced under the pallet and lifted with said pallet retained thereon. The conveyor 27' may be a power operated belt conveyor interlocked in its operation to operate upon the removal of the endmost pallet therefrom by energizing a limit switch actuated when the pallet is removed from a pressure plate under the platform at the end of TS. When the endmost pallet is lifted, release of the load therefrom is operative to actuate said limit switch for completing a circuit between the motor driving the conveyor 27' and a power supply to effect the prepositioning of the next pallet at the end of said conveyor.

Figures 3, 4, 5, 6:
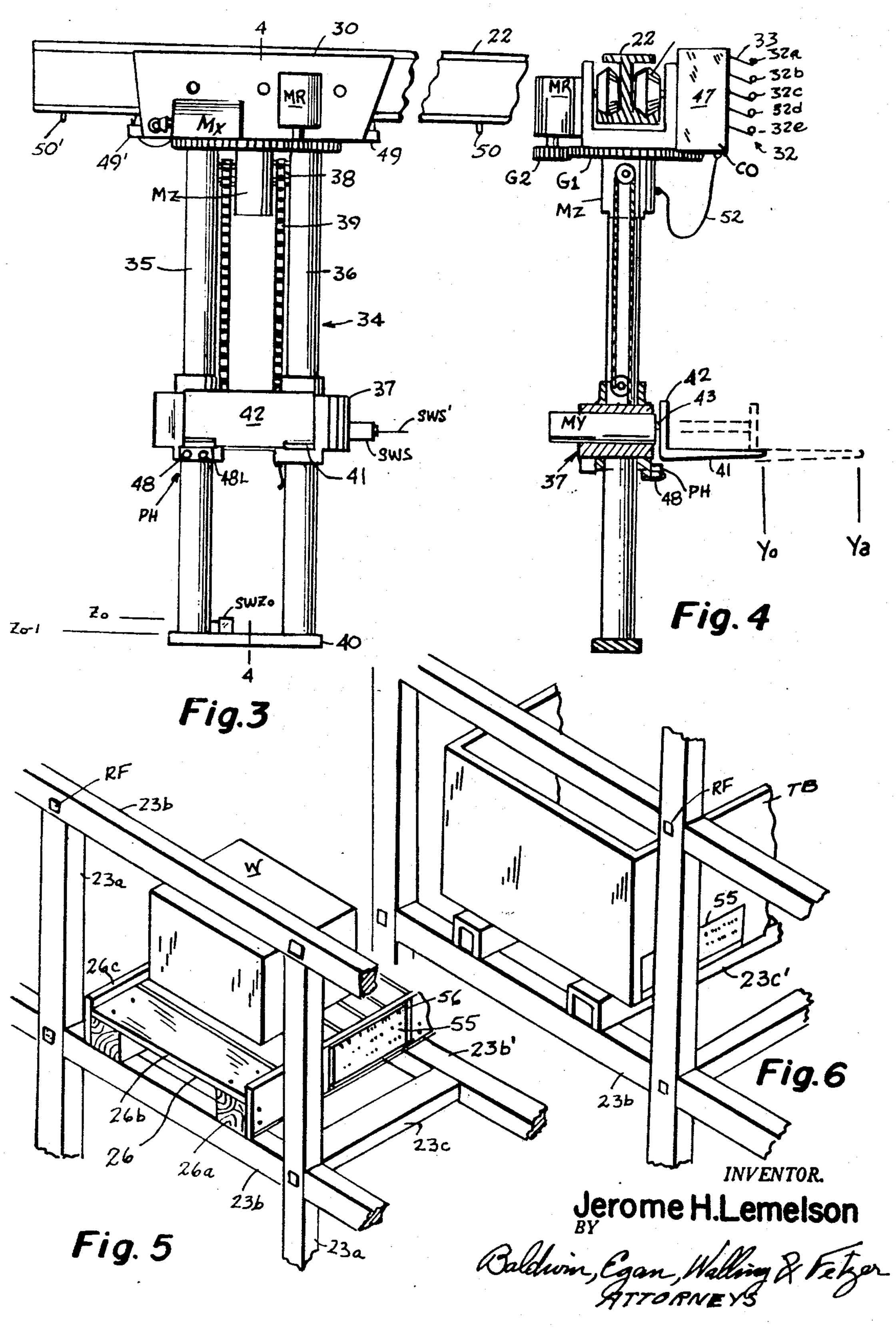
FIG. 3 is an end elevation of a carrier and track employed in the system of FIG. 1.
FIG. 4 is a side view of FIG. 1 with parts broken away for clarity.
FIG. 5 is an isometric view of one form of storage rack applicable to the carrier serviced apparatus of FIGS. 1 and 2.
FIG. 6 is an isometric view of a modified form of FIG. 5.

The carrier CA is illustrated in FIGS. 3 and 4 as comprising a track travelling carriage 30 having wheels 31 and driven by an electric motor MX for powered travel along overhead track 22 extending parallel to the storage racking 23. Overhead power lines 32 extending parallel to the track 22 provide electrical energy for operating the servo motors of the carrier CA. Electrical coupling is attained by means of brushes 33 extending from the carriage 30 which sweep lines 32. A fixture 34 extends from and is rigidly secured to the carriage 30. A fixture 34 comprises a vertically extending assembly of two cylindrical structure members 35 and 36 which serve both as a support and a track for a second carriage 37 which is adapted to be driven from a position near the top of said vertical track to a lower position near the bottom thereof by a motor MZ. The motor MZ is secured underneath the overhead carriage 30 between the vertical members 35 and 36 and drives the carriage 37 through a chain drive 38, 39. A pair of lift forks 41 project from a mount 42 outward from the carriage 37 and are movable thereon where they may project further therefrom a distance equal to at least the length of the forks. Fork mount 42 is mounted on a shaft 43 which is driven horizontally by a lineal motor MY.

An electrical coupling is provided between the carriage 37 and the remainder of the carrier by conventional means. The notation 47 refers to a housing in which a receiver and positional control components are mounted for providing control of the various carrier servos.

Other components associated with the carrier assembly include a photoelectric scanning device PH comprising a photoelectric cell 48, and a light source 48L positioned adjacent thereto to project a beam of light in the direction of the racking 23 which intersects reflective markers RF positioned on said racking which light beam is reflected back to the cell causing a pulse to be generated thereby which may be used as a feedback control means for indicating the motion of carriage 37 in its travel up and down 34. The housing indicated by the notation PH includes amplifying means for the cell 48 and means for generating and transmitting pulse signals to control means in 47 each time carriage 37 passes a storage bay location or position and a reflective marker.

A motor MR is shown mounted at the side of the carriage 30 and may be utilized to rotate the assembly below so that the forks 41 are accessible to both sides of the corridors and may service racks on either side as well as perform other functions. The track assembly 34 is secured to a large spur gear G1 which is rotationally movable below the carriage 30. A second gear G2 rotates G1 when driven by MR. Notation 52 refers to a slack loop of cable extending from the housing 47 for electrically connecting the control apparatus in 47 with the servos of the carrier assembly therebelow. An end plate 40 joins 35 and 36 at the lower end.

The scanning photoelectric cell 48 and the reflective markers RF on the track or racking are so positioned that the forks 41 extending from carriage 47 will be positioned in alignment with a selected storage bay when controlled thereby. Motors MX and MZ, by operation of the scanning relay, will so position said forks that they may be driven forward thereafter and will clear the lower bar **23*b*** of the racking and move under the pallet in the selected bay whereby it may be lifted and easily removed from said bay by further motion of the forks.

FIGS. 5 and 6 illustrate details of the storage racking and pallets 26. In FIG. 5 the racking comprises a box-like assembly of vertical beams **23*a* joined with horizontal beams 23*b* and 23*c* to form cubicles. The rack design is such that an array of side-by-side and vertically tiered cubicles are formed with horizontal struts 23*b* provided on which may be rested the bottoms of pallets or box-like product containers. In FIG. 5, a pallet 26 of conventional design nests in a cubicle with its skids 26*a* resting on a front strut 23*b* and a rear strut 23*b'*. By automatically controlling the motion of the forks 41 of the carrier CA, the pallet 26 may be automatically placed in a bay for storage in the position illustrated or removed therefrom without the need for human direction or control. The notation 26*b* refers to the cross-slats comprising the floor of the pallet 26 which are secured to the skids 26*a*. Said skids 26*a* position the floor slats 26*b* above the level of the horizontal struts 23*b* so that the forks 41 may be moved under the pallet between the skids during the act of lifting said pallet. The notation 26*c* refers to sides or stops secured to the pallet skids 26*a* to prevent the load or work W from laterally sliding off said pallet. The notation 55 refers to a coded card secured to side slat 26*c* which is positioned thereon whereby it will be scanned by photoelectric scanning apparatus SC when said pallet is moving along the conveyor 24. The card 55 is removably secured in a frame 56** which is secured to the side slat 26c and contains marks or reflective spots 56 in the form of a code or codes which are effective in providing pulse signals, when scanned as said pallet moves along the conveyor 24 which codes may be utilized to identify the pallet for automatic removal from the conveyor and as a means for effecting the control of the motion of the carrier apparatus in the act of storing said pallet in a predetermined storage volume. An effective combination of elements for photoelectric reading of a digital code for this and other applications is to provide card 55 as a conventional punched card with holes therein replacing said card markings. A sheet of reflex reflective sheeting such as Scotch-Lite may then be placed behind said card. If a light source is provided adjacent to or behind the scanning photoelectric cells (S1, S2, S3, S4, etc.) of FIG. 7, then that surface of the reflex reflector essentially a point or small patch of light back to the photoelectric scanning cell. A highly efficient scanning method is thus provided. It is noted that the said reflex reflector backing for 55 may be replaced by a sheet or coating of a material or paint of sufficiently different reflectivity than the ambient light in the system to permit said photocell to become energized whenever a cutout passes the scanning axis of said cell.

FIG. 6 shows a box or tote carrier TB for containing a product or material. Said box TB is shown resting on runners or skids 23c′ which are part of the racking 23 and which support the bottom of TB above racking horizontals 23b. The forks 41 of the carrier may thus be moved under TB and will clear said racking horizontals 23b. A coded card 55 is secured to the side of TB such that when the box is aligned on the in-flow conveyor 24, card 55 will be correctly scanned by the photoelectric scanning apparatus SC as it passes. In FIGS. 5 and 6, the notation RF refers to reflective markers positioned on the structural members facing the aisle for energizing the photoelectric cell 48 of the carrier CA by reflecting light thereto as the carrier CA moves past. It is noted that runners similar to 23c may also be secured to the bottom of box TB to effect the same function as beams 23c.

Figure 7:
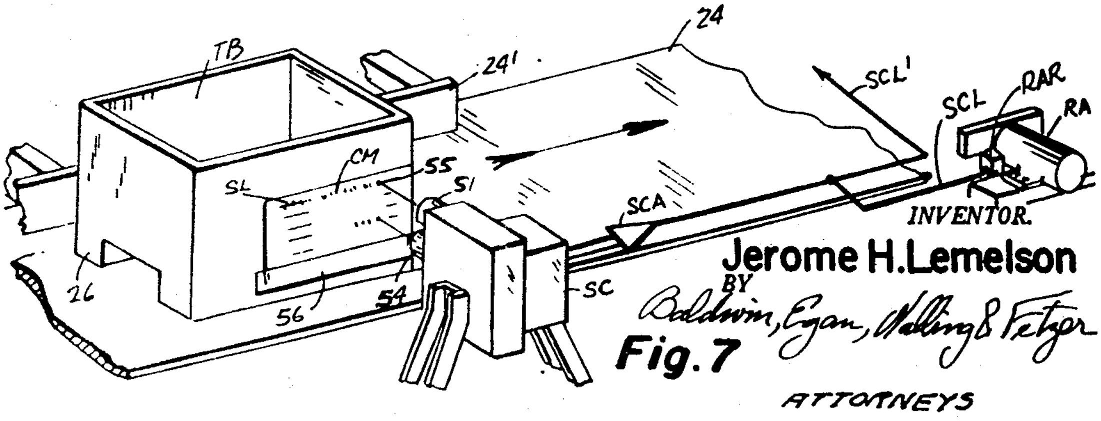
FIG. 7 is an isometric view of a portion of a belt conveyor showing details of a pallet scanning and load transfer apparatus.

FIG. 7 shows details of a scanning station having a photoelectric scanning and detection means SC for scanning the coded markings CM on the code bearing card 55 which is secured to the side of a pallet or box TB. The card 55 is provided with one or more code bearing levels or lines SL each arranged with marks which provide, when scanned, a digital pulse code on the output of the scanner transmitter SCT for transmission to a conveyor positional control computer. The scanner SC performs two functions. It identifies the fixture or pallet TB according to the markings on 55 and, if TB is destined for a storage position in a bay situated in the corridor associated with said scanner, actuates a servo in the form of an air cylinder ram RA which operates to urge the palletized load TB just scanned off said conveyor 24, as it moves in alignment with said ram, whereby said pallet is transferred onto temporary storage ramp TS. The recordings or scanning lines SL are at different levels relative to, and may be scanned by, respective photoelectric cells each of which is positioned to scan a respective line of said recording or code. The codes may be arranged so that they may be indicative of which station or aisle the load 26 is to be discharged whereby the simultaneous scanning of two of said lines, having predetermined marks may be used to energize a relay and trigger the action of the ram RA when the pallet is in alignment with ram RA. In FIG. 7, two scanning photocells S1 and S4 are positioned to scan at the level of the first and fourth lines of the card. By providing a photoelectric control including an amplifier and relay in circuit with each level reading scanners, and adjusting said scanner to transmit a pulse over an output circuit each time said associated cell scans past a mark on 55 and connecting both output circuits to a logical AND circuit SCA, then an output pulse will be produced from SCA whenever both cells simultaneously scan a mark on their respective lines which pulse may be used to effect operation of the associated ram. The pulse output from SCA may be passed over two circuits SCL and SCL′ to (a) a delay relay control RAR for actuating, at a time delay period thereafter, to effect operation of the ram RA for pushing TB off of 24 and (b) to a relay CR–1 which is effective in completing a circuit between the output of the transmitter SCT and the input to a receiver-controller associated with the carrier CA adapted for effecting transfer of TB to the storage position indicated by said coded control message recorded on 55. The relay CR–1 may also be energized or actuated by part of the coded command message. Since the conveyor 24 is moving at a constant speed, the scanning rate of all coded cards 55 will be the same. Hence, the length of the marks and their spacing may be used to produce coded pulses or a digital code output and may be used to effect positional control of the carrier transfer apparatus CA. The notation 24′ refers to a guide-bar positioned across 24 which is utilized to slide tote boxes or pallets across 24 closer to the scanner SC and align them relative to the scanner.

Figure 8:
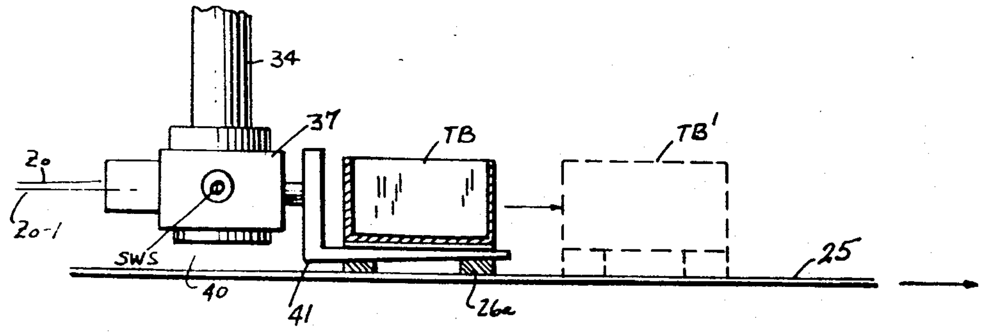
FIG. 8 is an end view of the out-flow conveyor of FIGS. 1 and 2 showing a product discharge sequence.

The position of the conveyor carrier and forks during the transfer of the palletized load 26 from the forks 41 to the outflow conveyor 25 is illustrated in FIG. 8. Such transfer is accomplished by lowering said forks while they are over the conveyor 25 and extend in the direction of said conveyor, such that the skids 26a of the pallet or tote box engage the conveyor and are carried thereby after said forks disengage from the bottom of the pallet as illustrated. The control means for the carrier retains the forks in position until the pallet or skid-box TB clears the end of the forks as at TB′ whereafter the control operates to move the carrier away from conveyor 25.

In FIG. 8 the notation SWS refers to a normally closed limit switch mounted on fork carriage 37 and having a long actuator arm SWS′ shown in FIG. 3 which projects outwardly therefrom. The switch is provided as a means for preventing the carrier from engaging and crushing or pushing an object or palletized load off conveyor 25 as the carrier moves over the conveyor to assume the discharge position illustrated. A condition may arise whereby a palletized load will pass on the conveyor 25 just as a carrier approaches the same position to discharge a load thereto. The arm SWS′ projects outwardly from the carriage 34 to a position whereby it will become deflected if it strikes an object on the conveyor. Limit switch SWS is provided in circuit with the power line to motor MX which circuit it will break when its arm is deflected and will stop said motor when so actuated and while the arm is deflected until the load passes.

After the palletized load has passed, SWS returns to its normal position and a circuit is again completed between MX and a power source until the switch 49 is actuated when said carrier is over 25.

The letters SWS refer to a limit switch mounted on the side of 37 having a long toggle arm SWC′ which may be used to indicate the position of the top of 25 relative to 37 and effect the stoppage of the motion of 37 downward by transmitting a pulse or breaking a circuit between MZ and a source of power when so actuated. The switch SWS may be used to replace one or more of the time delay relays of FIG. 12 or 20 by serving to indicate just when the carriage 37 has been driven to the (Zo–1) position or level. This is described in more detail in the description of FIG. 20.

The following description of possible movement of the components of the conveying apparatus CA will first be described prior to describing a control sequence for storing a product. The motion of the carrier and forks will hereafter be referred to in terms of the following notations: X will refer to the direction of all movements parallel to the aisle C along which the carrier CA travels, Y will refer to motion in the horizontal plane and perpendicular to the track 22 or racking 23 such as the direction of motion of the forks 41 toward and away from the racking in the act of storing or removing a palletized or boxed product and Z will refer to all vertical motions such as that of the forks and sub carriage 37. A storage volume in the system may thus be specified and referred to by three reference numbers which connote the X, the Y and the Z location of said volume. For example, the fifth corridor (C5) in the system would have a Y value of 5. A storage location in the racking located 25 cubicles from one end would have an X value of 25 and any vertical location thereof may be designated with a corresponding Z value. Thus, by numerically designating each unit volume or storage location with its corresponding X, Y and Z values any specific volume may be attained by automatic means provided that the correct position-indicating and feed-back as well as automatic controls are provided. Positional control is effected by indicating by means of a signal whenever the carrier CA passes a storage volume or position in the X direction and using this signal to control the motor driving CA along the track 22 in response to a command input. The same means may be employed to indicate and control the vertical motion of the forks 41 on the carrier guide. As stated such feed-back may be provided by utilizing a photoelectric cell 48 mounted adjacent to the forks 41, to scan the racking and indicate by detection of reflective or other markings thereon whenever said forks pass a given storage position or volume. The photoelectric cell may thus be used to uncount a counting device preset by pulse signals from the mentioned transmitters and to effect stoppage of the motors MX and MZ whenever a preset count has been reached indicating that the forks are opposite a selected unit volume or storage bay.

Reference is made now to FIG. 1 to generally describe a cycle of movement of the conveying apparatus in the act of storing a load. Assuming that the carrier is stopped and that the forks 41 have been automatically driven to position Z=0 by the previous action, and that a sequential command message comprising a series of signals or train of pulses is transmitted from the remote scanning apparatus SC over the power lines or via short wave to receiving apparatus mounted on the selected carrier, and said carrier contains means for storing and reading each command message received thereby. The control signals are thereafter reproduced and utilized to effect either the removal of a palletized product from a desired storage location or unit volume to said discharge conveyor 25 or the transfer of a palletized product from the temporary storage platform TS to a predetermined unit storage volume. In the act of storing, the following sequence of movements of the conveying apparatus may occur.

(a) From a position at X–N with the forks at Z=0 the carriage motor MX starts and drives the carrier assembly to the X location illustrated as X*o* whereupon the motor MX is automatically stopped with the forks 41 opposite and at the level of the pallet of the desired product on the discharge platform TS at a level to be engaged and picked up thereby. The forks 41 are then automatically driven from a retracted position Y*o* to an advanced position Y*a* in which they clear but are under the pallet 26. The forks then are automatically driven to rise a distance sufficient to lift the pallet whereby the skids thereof clear the platform at the end of TS. Theh forks 41 are next automatically retracted from position Y*a* to Y*o*. The load is now ready to be transferred from X*o*, Z*o* to the bay location predetermined by the code of the pallet.

(b) A signal from the positional control computer CO starts MX which drives the carrier towards the desired X location. Control is effected by the photoelectric cell 48 mounted at the level of the forks which is adapted to move up and down therewith and which scans the storage area and particularly the levels of the racking having indicating marks RE thereon. Thus a pulse is transmitted to the control computer CO each time a marker is passed by the apparatus. These pulses are used to uncount a preset counter which indicates when the apparatus CA is aligned with the X location of the selected bay in which it is desired to store the pallet. The counter thus effects stopping of the motor MX and also is effective in starting the motor MZ driving the forks to the height of the selected unit storage volume. The photocell scans and transmits feedback signal pulses to CO as it passes indicating markers in vertical alignment which are used for uncounting a preset counter which has been preset by the signals received by previous scanning. When the forks are stopped at the desired Z position an automatic control means energizes MY, after effecting the raising of the forks a Z distance high enough for the forks to clear the shelf or rack. The automatic control means is also effective in advancing the forks to the extended position and in lowering the forks a degree such that the pallet rests on the shelf or racking with the forks clearing the bottom of the pallet yet free to retract to clear the racking. The forks are then driven automatically to ZO whereupon the carrier apparatus shuts off until it receives further command signals.

In the act of removing a palletized or boxed load from a selected storage location and transferring it to shipping conveyor 25 the following movements will be effected:

It is assumed that the carrier CA is stopped at any X position and that the forks 41 are at Z=0 by previous action. The sequential command computer CO mounted on the carrier has been set up as the result of the receipt of signals by carrier receiver in 47 transmitted from a remote transmitter which signals are effective in controlling the motion of the forks from their at rest position to a desired storage volume and in removing the palletized load therefrom and in transferring said load to the end of the trackway whereupon it is automatically deposited onto the shipping conveyor 25. The entire control sequence is automatic and includes:

Control is effected of the motion of the carriage by controlling servo MX by means of a presettable counting means which is uncounted by feedback signals generated by the described carrier mounted photoelectric scanning apparatus PH for controlling the motion of the carrier as described to a position in alignment with the bay in which the desired product is located. When servo MX stops, servo MZ is started to drive the forks 91 to the desired Z location opposite the bottom of the bay in which the product is located. MZ stops and the forks advance into the selected bay to a position under and clearing the bottom of the pallet therein. The forks are then controlled to rise a sufficient distance to lift the pallet to clear the racking bottom or shelf after which motor MZ is stopped and motor MY operated to retract said forks to clear the racking. The forks are then lowered to position Z*o* at the bottom of fixture 34 and servo MX is started to drive the carrier assembly to a point over the shipping conveyor 25. The forks are then lowered to near position Z*o* where the pallet skids **26*a* rest on the conveyor 25** and are carried thereby off the forks. The carrier, a delay period thereafter, is automatically driven to any desired homing position along its track.

It has been noted prior to this and illustrated in FIG. 6 that this system of automatic transfer may be applied to products or objects which are not pallet or skid mounted with some minor changes of the conveying equipment. In discharging a box (such as TB of FIG. 6 which does not have skids or runners on its bottom) from forks such as 41 in the act of transferring it to a conveyor such as 25 or a chute for gravity travel to another area, a pusher element of conventional design (such as lift truck pushers which extend and move over the forks for sliding a load thereon off said forks) may be employed to move such a load thereoff onto 25. The action of said pusher element would be automatically controlled and synchronized to occur at a time interval after the forks are lowered to the position illustrated in FIG. 8 just over, but not engaging the top surface of 25. Control is effected in FIG. 14 for example, by the provision of a delay line 2′ to effect operation of the pusher P after the forks 41 have been lowered to the Z*o*–1 position.

FIGS. 9 to 17 illustrate electrical control circuitry adapted for automatically effecting the described motions of the carrier CA and the forks in the act of either conveying a palletized load 26 from the temporary storage conveyor TS to any selected storage bay in the volume serviced by said carrier or in an act of removing a load already in a selected storage bay and then transferring it to a remote position such as unloading it onto the conveyor 25. In this system, control elements such as known logical AND, OR, NOT, TIME DELAY and flip-flop bistable elements are utilized. Logical static switching elements such as produced by Westinghouse Electric Company under the trade name Cypak may be utilized and it is assumed in the block and schematic diagrams provided that a sufficient source of electrical energy is provided on the correct side of all switches, relays, logical control elements and the like provided. Generally, unless otherwise indicated all current transmitting lines are assumed to comprise complete circuits so that the actuation or energizing of one of said components will result in a current or control pulse being transmitted to the other.

The following circuit and component identification is presented to simplify the description of the control means illustrated in FIGS. 9 to 17 for controlling the motion of the product carrier in the acts of storing or transferring from storage palletized loads:

MX—A reversible motor for driving carrier 30 along track 22 and having forward, reverse and stop controls referred to by notations F, R and S which are pulse actuatable.

MY—A reversible motor or power operated ram for projecting and retracting the forks 41 of the carrier having pulse operated forward and reverse controls F and R.

MZ—A reversible motor for driving the fork mounted carriage 37 in the vertical direction and having pulse actuated controls including a control U for effecting fork carriage movement upward, D for effecting downward movement of the forks and S which, when pulsed, stops the operation of the motor.

CR—Code or signal operated relays which control respective switching means such as rotary stepping switches or normally open switches to permit the passage of predetermined portions of the command message or code used to effect control of the carrier and fork servos to respective predetermining control circuits.

RE—A pulse actuated solenoid or relay which is operative upon receipt of the feedback pulse to step a rotary stepping switch to a new position.

ST—A predetermining controller such as a multi-circuit timer which becomes operative when its input is pulsed and provides a control sequence for controlling servo motors to move the load carrying forks in a path necessary to transfer the load or pallet contained thereon into a storage position or bay aligned with said forks and to lower said pallet a degree whereby it is resting in the storage position and to further effect control of the fork servos in retracting the empty forks from the storage position.

REM—A predetermining controller which becomes operative when its input is pulsed and is effective in controlling servos MY and MZ to move the forks 41 in a path necessary to engage the pallet in alignment therewith and to remove it from storage.

DIS—A pulse energized predetermining controller which is operative in controlling the servo motors to effect discharge or transfer of a pallet on the forks onto an unloading or outgoing conveyor immediately therebeneath.

P*r*CM*x*—A pulse presettable, predetermining counter adapted for controlling the operation of servo motor MX. The counter is preset upon receipt of a predetermined number of pulses derived from a portion of the command message gated thereto which pulses are indicative of the degree of travel of the carrier along its track which will preposition the forks in alignment with the tier of storage bays containing the bay into which the forks must move to store or remove a pallet therefrom. The counter is uncounted by feedback signals generated with increments of movement of the carrier along its track, said signals being derived by scanning position indicating markers on the racking or track or the actuation of a limit switch with incremental movement of the transfer carriage.

P*c*CM*z*—A pulse presettable counter which is preset and operative in a manner similar to P*r*CM*x* but is connected for controlling the operation of motor MZ for prepositioning the pallet holding forks at the desired height position prior to their further movement in either the act of removing a pallet from storage or placing one in storage.

SWZ*o*—A limit switch which becomes actuated when carriage 37 is driven to a position just above the lowermost position in its travel. This switch is of the over-ride type which is actuated once each time during the downward travel of the forks.

49, 49′—Limit switches mounted on the carriage 30 of the track travelling carrier CA each of which is adapted to become activated when the carrier is driven to a respective end of the track 22 and the actuator arms of each are deflected by pins 50 and 50′ secured to and projecting from the track.

Switch 49, when actuated, is adapted to effect the transmission of a pulse to the stop control of motor MX and to the energizing input of controller REM to effect the pick up of a load from the temporary storage platform TS over which pin 50 is located. Switch 49′ when actuated, energizes control S of motor MX to stop the carrier over the outflow conveyor 25 and sequential controller DIS to effect discharge of the load or pallet on the forks to said conveyor. Both switches are of the over-ride type and generate a single pulse during movement past the pin in one direction.

Figure 9:
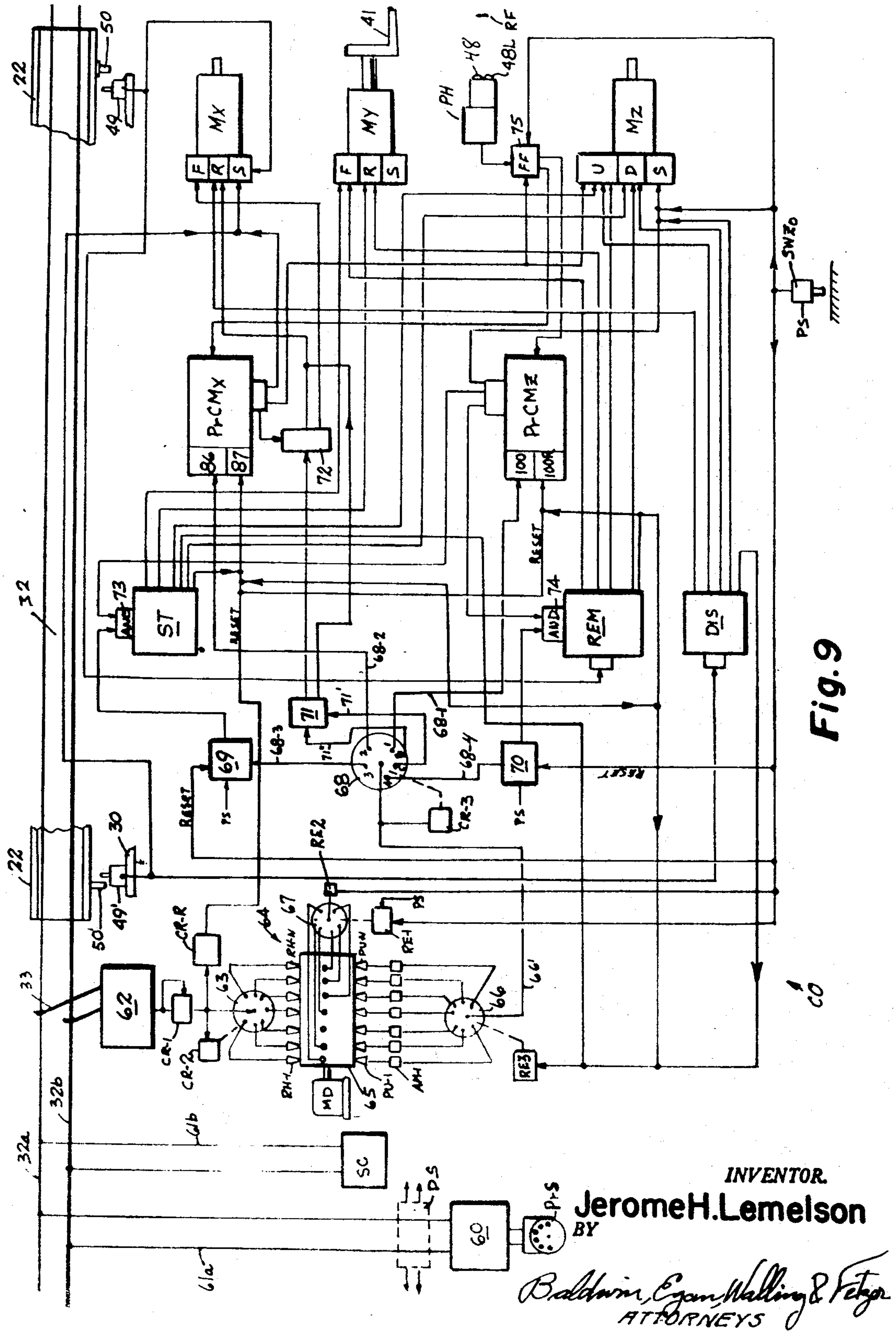
FIG. 9 is a diagram illustrating the control circuits and components for controlling the operation of the carrier illustrated in FIGS. 2 to 4 for moving loads into storage and removing selected loads from storage.
Figure 9:
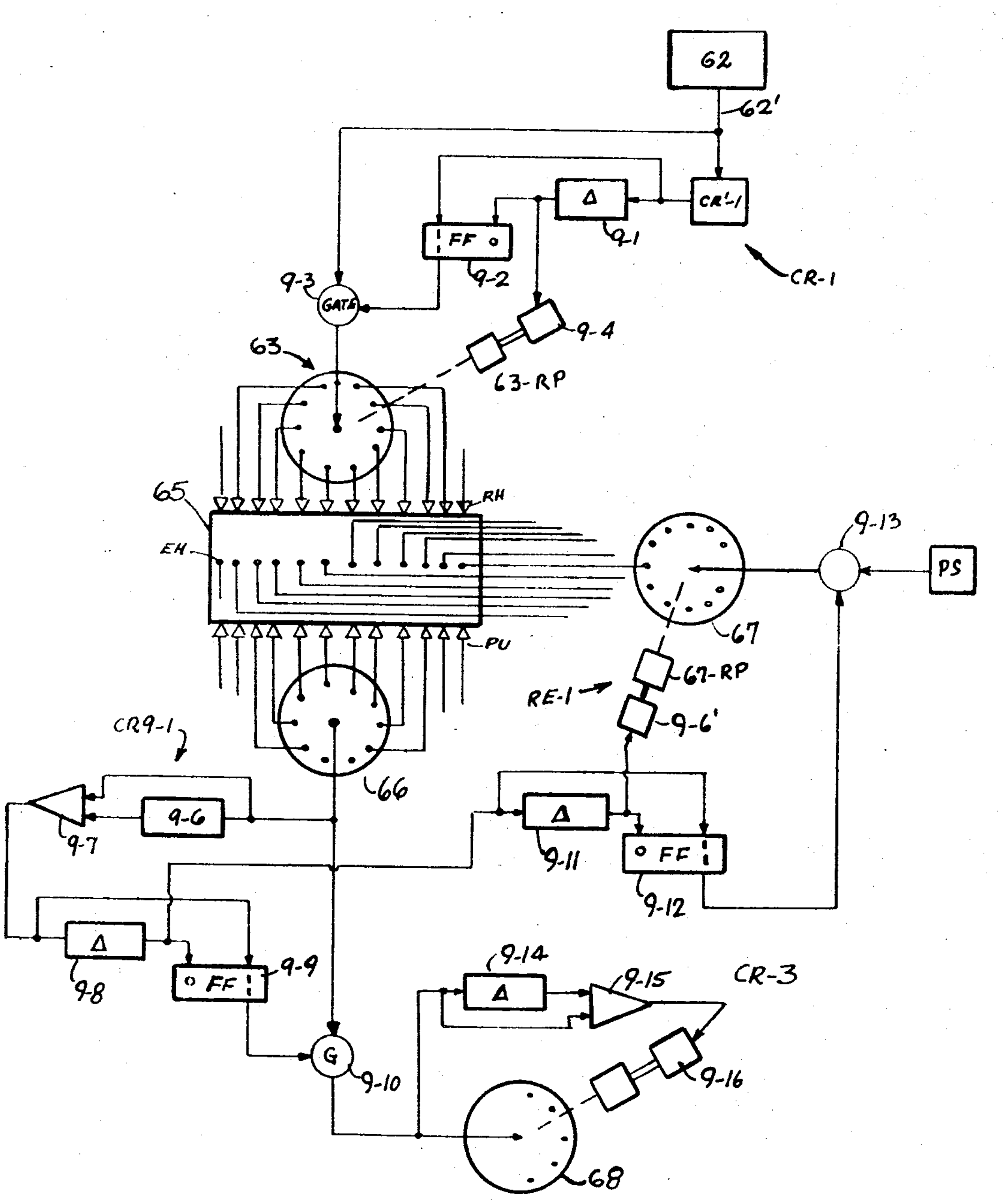

FIG. 9 broadly illustrates means for controlling the carrier and the conveying apparatus described. Electrical transmission lines 32 are provided for the transmission of power and command message signals from a remotely located transmitter 60 and/or from the pallet card scanning transmitter SC. Input to transmitter 60 may be in the form of specific modulated signals or tones, or pulse codes such as a binary code or pulse trains derived from a manually operated dial switch P*r*S which is operated by a human dispatcher or a punch card operated reader or punch-to-code converter, from a tape scanner such as a photoelectric reader, or from a storage means or digital computer. The signals are transmitted over the lines 32 in groups of modulated signals or pulse trains. A particular message or pulse train may contain, for example, complete control signals in decimal or binary code, portions of which are not only capable of presetting the various predetermining sequential controllers to be described but are also effective in gating other portions of said message as respective trains of pulses to the various control components by the actuation of coded switching relays by other portions of each message preceding the portions to be gated. The block indicated by the notation DIS refers to a conventional dial operated multi-circuit switching or distribution system for distributing or multi-plexing a particular command message to one of multiple of receivers in said system each of which is adapted to effect control of the motion of a particular carrier servicing a particular storage aisle. The distribution system may be similar to that used in a conventional switching and connection telephone dial operated communication syster or may comprise a multi-circuit selection switch operated to step the output of the transmitter 60 to one of said multiple receivers by manual or automatic setting. It is noted that, while FIG. 9 shows a transmission network consisting of wire conductors, these may be replaced by microwave or short wave sending and receiving apparatus thus eliminating all wires.

Assuming that a circuit is completed to a particular receiver 62 from either transmitter 60 or scanner transmitter SCT via transmission lines **61*a* or 61*b* and 32, a normally open coded relay operated switch CR–1 is employed at the output of receiver 62 which relay may be responsive to the first part of the code message and is used, when energized thereby, to gate the remainder of the message to a further recording means associated with the particular carrier. If a coded relay is utilized, more than one receiver may be employed and operatively connected to the same transmission line. If the signal is generated and transmitted as a carrier signal, the lines 32 may be the described common power lines of the system. The coded relay CR–1 becomes energized in response to a specific signal or pulse code and passes the remainder of the command message through a rotary stepping switch 63 to a multiple channel magnetic storage device 64 which comprises, in FIG. 9, a constant speed rotated magnetic storage drum. Such a storage device is provided at the receiving end of the control system to store each command message passed through CR–1, which recorded message may be randomly or sequentially received while the conveying carrier CA is in use and under the control of a prior received control message. The receiver 62 and the other apparatus to be described, including the signal storage device 64, are preferably mounted in the described housing 47 which is secured to the overhead carriage 30, although said control apparatus may be mounted in a stationary position in the storage system and utilized to effect control by transmission over the multiple conducting lines 32** which are electrically connected to the various servo-components.

Stepping switch 63 is controlled to switch the output of receiver 62 to one of a multiple of separate recording circuits by the operation of a solenoid which is energized by a pulse from a coded relay CR–2 which is connected to the output of 62 and which is energized by part of the code message passed to 63 through CR–1. The solenoid of CR–2 is operative to step and switch the input from 62 to a particular output circuit of 63 prior to or after receipt thereby of a new coded message. The outputs 63 are each connected to respective magnetic recording heads RH referred to by the notations RH–1, RH–2, RH–3, etc., each of which is operatively connected to the output of 62 and adapted to record on a single channel thereof during not more than one rotation of said drum. The drum is driven at a constant speed by a motor MD. The storage apparatus 64 may also consist of other types of pulse storage means such as magnetic storage matrices, digital or decade counters, or delay relays. Associated components of the magnetic storage unit 64 include (a) individual magnetic erase heads EH for selectively erasing each command message recorded on the magnetic surface of the drum after said message has been reproduced therefrom and utilized to effect control of the carrier servos so that the channel just reproduced from will be conditioned for recording another message thereon, (b) magnetic reproduction heads PU referred to by the notations PU1, PU2, etc., which are adapted to selectively reproduce each message in the order of recording. A stepping relay switch 67 is utilized to effect the erasure of signals from each channel after reproduction therefrom by gating a power supply PS to the erase head associated with the channel last reproduced from. Switch 67 is stepped by a solenoid RE–1 which is energized by a signal transmitted thereto from the mentioned switch SWZ*o* situated at the bottom of the vertical track of the carrier CA when said switch becomes actuated as the carriage 37 is driven to its Z*o* position. The switch SWZ*o* is a multiple output, normally open, monostable, over-ride switch having an actuating arm positioned relative to 37 whereby, when closed by the downward travel of 37, it will transmit a pulse on the multiple circuits illustrated for effecting the following control functions. SWZ*o* when actuated, energizes relay RE–1 which steps the switch 67 to energize the next magnetic erase head for erasing signals on the channel just reproduced from. Another output of SWZ*o* is pulsed when said switch is actuated to actuate a relay and close normally open relay switch RE–2 which is slow to open and remains closed thereafter long enough to gate a power supply PS through 67 to said erase head to erase the entire channel during at least one complete revolution of the drum 65. The outputs of the multiple reproduction heads PU are connected to respective switch terminals of a rotary stepping switch 66 having a single output. The switch 66 is stepped to a new switching position by means of the same signal from limit switch SWZ*o* which energizes relay RE–2. The signal from SWZ*o* is also passed to a solenoid operated relay RE–3 for stepping the switch 66 to the next position. The remaining portion of each control message which is reproduced is passed to the output 66′ of 66 which extends to other control circuits which remaining message portion is used to preset or energize said circuits to provide a sequence of control functions to eventually effect a predetermined motion of the components of the conveying apparatus CA in the act of storing or removing from storage a pallet or object located in or destined for a predetermined storage bay by effecting control of the servo motors MX, MY, MZ, MR driving said carrier components.

From the output of 66, the control message is passed to a multiple output gate 68 which is operative to pass respective parts of said message in the form of groups of pulses to respective control devices to preset or actuate the various control components illustrated. The gate or stepping switch 68 is a six position switch which is controlled to step and remain at each of four of the switching positions for time intervals during which a respective part of the signal is passed to a respective controller to preset or energize said controller. Stepping of 68 is effected by means of a coded relay CR–3 which is responsive to coded parts of the control message provided between control signal components of the message to be gated therethrough. The coded relay CR–3, each time it is actuated, energizes a solenoid which steps switch 68 one output position counterclockwise from a home or open position. The other outputs of 68, when switched, respectively connect its input with (a) an input 68–1 to a positional controller P*r*CM*z* for gating part of the control message thereto with preset said controller so that it may be used to control the degree of rotation of the servo motor MZ and thus effect positional control of the height of travel of the forks 41, (b) an input, 68–2 to a positional controller P*r*CM*x* which is effective in controlling the operation of motor MX and thus the degree of travel of carriage 30 along the track 22, (c) holding relay switch 69, such as a bistable or flip-flop switch, which gates a power supply PS to one input of a first logical AND control 73 which, when the other input to 73 is energized, effects operation of a sequential controller ST which controls the motion of the forks 41 from a position opposite the selected bay or storage volume into said volume in the act of storing or setting down a palletized load therein, (d) a circuit 68–4 to a holding relay switch 70 which is a bistable or flip-flop switch operative to gate a power supply PS to one input of a logical AND control 74 which, when another input thereto is energized, effects the operation of a sequential controller REM to effect control of the fork driving servos to automatically move said forks in a predetermined path from a position opposite the selected storage volume into the storage bay in movement whereby they position under and engage a pallet therein and lift and retract to remove said pallet therefrom. The switches 69 and 70 may be bistaple switching elements or circuits (unlimited TIME functions) of which a variety of electromechanical or electronic flip-flop circuits are known. Part of the command message gated through either the 3 or 4 output circuit of switch 68 is passed to either 69 or 70 which is switched thereby to gate a prolonged signal from a power supply PS to one input of one of two logical AND circuits 73 or 74 which respectively control, when energized, the sequential switching action of respective controllers ST and REM to be described. The switched condition of switches 69 or 70 remains until the other input of said bistable switching circuits receive a pulse from SWZ*o* at the end of the controlled cycle. Either 69 or 70 are selectively energized during each fork movement cycle to control the motion of the forks for storing or removing a pallet which action is dependent on the composition of the command message. The resulting inputs to switches 69 and 70 are both connected to be pulsed when switch SWZ*o* is activated when the platform or forks 41 is driven to its lowermost position after storing or removing a load from the selected storage bay. The last part of the signal passed through gate 68 is passed to a coded relay or solenoid operated switch 71 which passes portions of the code signals to either a bistable switch 72 or directly to the reverse drive control R of servo MX. The relay or switching device 71 may comprise in a single form a bistable electronic or electro-mechanival, solenoid actuated switch having a single signal input from 68 for the passage of a signal part of said command message over one of the two illustrated output circuits therefrom. If 68 is an electro-mechanical switch, it may be operated to attain a desired one of its two bistable output conditions by the use of two pulse energized solenoids each having an input from a separate output of 68 whereby said command message is designed to skip or step over one of the two respective outputs thereto and pass a pulse only to the other, thus energizing but one of the two solenoids and switching 71 to a desired one of its bistable states. This would require an additional switching position between the 5 and 6 positions of 68 with an additional circuit 71. If the particular command message includes means for effecting motion of the forks in the act of storing the pallet, it will be necessary to first effect motion of the carrier CA to the position which is adjacent the pallet receiving platform at station TS. The portion of the coded message passed to relay 71 may thus be adapted to actuate said coded relay 71 to gate a pulse signal directly to the reverse control R of motor MX.

If the particular coded signal is to be utilized to effect control of the carrier apparatus CA in the act of removing a palletized load from a predetermined storage bay, the degree of movement of the carrier 30 along track 22 will depend on its at-rest or homing position. After the output of 68 is stepped to the last switching position, it is further stepped by the last part of the command control message to the O or open switch position at which it is in a reset condition.

The positional controllers P*r*CM*x*, P*r*CM*z* are pulse presettable predetermining counters, while controllers ST, REM, and DIS are predetermining controllers such as multi-circuit timers having programmed in each, a control sequence for respectively effecting movement of the forks in the acts of storing a load, removing one from storage or transferring it to the discharge conveyor. Controllers P*r*C are preset by portions of the command message gated to each and uncount to effect motor control upon receipt of feedback signals generated by the photoelectric scanner 48 as it moves past reflective markers on the track or racking. Feedback signals may also be generated by a limit switch on the shaft of the various servo motors or by means of a limit switch having a switch arm which projects from the end of a fork and becomes actuated when the fork passes projections or vertical or horizontal bars of the storage racking.

In FIG. 9, the scanning photoelectric relay PH mounted on carriage 37 provides a feedback control signal which is gated to the positional control means P*r*CM*x* each time said carrier passes and the photoelectric cell 48 scans a reflective marker RF on the racking 23. Control of the motor MX may be effected when P*r*CM*x* either counts or attains condition preset therein or predetermined by that part of the command message which has been transmitted thereto, by the transmission of a pulse on one or more output circuits of P*r*CM*x* when said uncount is reached. Upon attaining said uncount condition, a first pulse is transmitted from P*r*CM*x* to the stop control of the motor MX thereby stopping and positioning forks in alignment with the desired bay. Controller P*r*CM*x* upon uncounting, is also effective in generating and transmitting a control pulse to the starting control U of MZ which drives carriage 37 up the track 34 of the carrier from the Z*o* position. P*r*CM*x* also simultaneously generates a pulse on another of its outputs which is used to actuate a solenoid operated flip-flop switch 75 which gates the output of PH from the circuit extending to the input of P*r*CM*x* to a circuit extending to the feedback input of controller P*r*CM*z*. As a result, all feedback pulses generated by scanner photoelectric cell 48 are utilized to control the travel of the carriage 37 both in the X and Z directions. When P*r*CM*z* has attained its present condition and has uncountered, it simultaneously transmits control signals or pulses over a plurality of circuits as follows. A first pulse is transmitted to the stop control S of motor MX which results in said motor stopping with the forks 41 aligned with the selected storage bay, so movement of the forks towards the racking when servo MY operates will cause said forks to just clear the crossbar **23*b* at the bottom of the selected storage bay and also clear the floor boards 26*b* of the pallet. A reproduction of said pulse is also transmitted to reset the flip-flop switch 75** so that during the next control cycle it will pass signals to the controller P*r*CM*x*. A further reproduction of said pulse is also transmitted from P*r*CM*z* to the AND control switch 73 of controller ST and a further reproduction of the pulse is transmitted to the AND control element 74 of controller REM. It has been previously noted that the original control message contained a signal component which was operative to effect the gating of a pulse through 68 to either switch 69 or switch 70 and thereby completed a circuit between a power supply and either the AND control element 73 or the AND controller 74. Thus either 73 or 74 will become energized and produce an output upon receipt of the pulse from P*r*CM*z* depending on which of the control switches 69 or 70 were energized as the result of the portion of the command message passed to either through 68. Thus, energization of either 73 or 74 results in cycle operation of their respective controllers ST or REM. Sequential, multi-circuit timer ST effects, by controlling the operation of motors MY and MZ, the motion of the forks 41 necessary to deposit a load or pallet in the bay or onto the racking in alignment with said forks. Controller REM effects by controlling the operation of motors MY and MZ, motion of the forks in a path for removing a pallet already positioned on the racking in the bay in alignment with said forks. The control ST includes means energizing the D control of MZ after the forks 41 are retracted out of the bay and clear the racking. This results in the carriage 37 being driven to the Z*o* position which, when it is reached, results in actuation of the switch SWZ*o* which stops MZ.

In order to complete the cycle of removing a load from a predetermined storage bay, the forks with the load thereon are next conveyed to a position over the outflow conveyor 25 and are further positioned to effect the removal and deposition of the pallet or the load onto said conveyor as illustrated in FIG. 8. A pulse or signal from sequential controller REM is generated when SWZ*o* becomes actuated and is transmitted therefrom to energize the F control of MX thereby starting said motor and causing the carrier to be driven along the track 22 to a position over the conveyor 25. A projecting element or switch actuator 50' extends from track 22 and is positioned whereby it will actuate a limit switch 49' on the carrier which transmits a control pulse over two circuits, one of which is used to effect stoppage of the motor MX and the second to start the motor MX to drive carriage 37 downward to the *Zo*–1 position whereby the pallet runners 26*a* or skids of the tote box engage the conveyor 25 while the forks 41 clear the bottom of said pallet. Thereafter the palletized load 26 is carried by the moving conveyor while the control DIS causes the servos to remain stopped for a period of time necessary for the pallet to move and clear the ends of the forks as indicated in FIG. 8. A delay period after arriving at the *Zo*–1 position after which said pallet is clear of the end of the forks, the controller DIS operates to effect movement of the carrier CA away from over the conveyor 25 so that it will not interfere with other pallets travelling on the conveyor. If there happens to be a palletized load or other object adjacent on in the path of the forks on the conveyor 25 as said carrier approaches, limit switch SWS mounted on 37 and having a switching arm projecting laterally therefrom becomes actuated when said arm strikes said load and is immediately effective in temporarily stopping motor MX and in stopping the motion of the carrier so that 37 and/or the forks will not strike said load and deflect it off the conveyor. When the load passes and the switch arm of SWS returns to a neutral position, said switch opens resulting in starting motor MX for continuing the discharge action.

A complete control cycle operative for effecting the transfer of a palletized load from its temporary storage position on platform TS to a predetermined storage bay in the racking serviced by the carrier CA may be described as follows. Part of the command message is transmitted to the switching input 71' of a coded relay 71 through multiple output stepped gate 68. Switch 71 is a bi-stable switch which is operative to pass the next part of the message code over one or two output circuits depending on the signal or signals passed through 68 to said switching input 71' thereof. Switch 71 may be a pulse-solenoid actuated three position electro-mechanical switch. If the control message is operative to effect storage function, the signal input to 71 is gated to the reverse drive control R of motor MX causing MX to effect movement of the carriage 30 towards the platform TS. A pin 50 projecting from track 22 is adapted to actuate limit switch 49 projecting from carriage 30, which action results in stopping motor MX with the forks 41 in alignment with the position of platform TS and in a position adjacent the foremost pallet thereon such that projection of the forks by operation of motor MY will position them under the pallet for lifting off said platform. Switch 49 is a double pole, center neutral, normally open switch which when actuated transmits a pulse over two circuits including a circuit for energizing the stop control S of MX and another for energizing the sequential controller REM which effects automatic control of movement of the forks 41 in a path for removing the pallet from the temporary storage platform. After the load has been lifted from its at-rest position on platforms TS and the forks retracted under the action of controller REM, a pulse is transmitted from REM to the forward start control F of motor MX for driving the carrier CA along the track 22 toward the X location of the bay or storage volume in which it is desired to store the load. As the carrier passes each bay position, the photocell 48 scans markers RF and transmits a pulse to P*r*CM*x* each time a marker is scanned. When P*r*CM*x* indicates that the position programmed therein has been attained by carriage 30, a pulse is transmitted therefrom to the stop control S of motor MX and a second pulse is transmitted to control U of motor MX. Motor MZ operates to raise carriage 37. Pulses transmitted from PH as 48 scans the reflective markers in its vertical path as the carriage 37 moves upward, are utilized to uncount controller P*r*MC*z* and are an indication of the degree of upward motion of 37. The positional controller P*r*CM*z*, upon uncounting, transmits a pulse to stop control S of motor MZ stopping carriage 37 in its upward travel at the desired height. Upon attaining this position controller P*r*CM*z* also transmits a signal to the input of logical AND circuit 73, the other input of which has already been energized as the result of the prior energizing of gate 69, when both inputs to the AND circuit become energized, the output thereof, a generated pulse, is passed to sequential controller ST which is operative to control servos MY and MZ to effect the motion of the forks in the act of positioning the pallet retained on said forks onto the racking storage position immediately adjacent and in front of said forks. Controller ST generates a final control signal after the forks 41 have retracted from the bay position empty, which signal is transmitted to control D of motor MZ causing the carriage 37 to be driven to the bottom of its track *Zo* level at which it is stopped by the action of limit switch SWZ*c*. The last pulse from ST is also transmitted over a second circuit to servo relay RE–3 for stepping the output of switch 66 to the next position whereby the next coded command message reproduced from 65 may be passed to output circuit 66' and used to preset the various control elements described for the next control cycle.

FIG. 9' illustrates further details of parts of the circuit of FIG. 9 associated with the recording and reproduction of message signals and includes further means for sequentially recording and reproducing said control messages from the recording drum. Since each message is recorded on drum 65 as it is received, the various messages recorded on 65 will not start at the same angular position of said drum but will initiate at random positions. Message read-out, synchronizing reproduction first of the beginning of said message prior to gating it to the further control circuits of FIG. 9, may be effected as follows. The first part of each command message, as transmitted from 60 to the receiver 62, contains a first portion to which the coded relay CR–1 is responsive which effects the energizing and closing of relay CR–1 which remains closed for a time interval to permit the entire message to be passed through switch 63 and the connected output therefrom extending to the recording transducer RH of the recording track of drum 65 in circuit with the input 63. The end of the message may contain a pulse code or signal for actuating coded relay CR–2 which actuates the servo driving switch 63 one position to cause the output of 63 to step to the next position when CR–1 automatically resets at a time interval sufficient to permit the longest expected command message to be passed to 63.

The output 62' of receiver 62 is connected to coded relay switch CR–1 and the first part of said output energizes a coded relay CR'–1 which, if responsive thereto, passes a pulse to the input of a time delay relay 9–1 and an input of a flip-flop switch 9–2 which passes a DC gating voltage to a mono-stable, normally open electron tube gate 9–3 thereby gating the remainder of the signal output from 62 to the input of 63. Delay means 9–1 operates at a time interval necessary to permit the longest command message to be passed through gate 9–3 to the input to switch 63 for an interval not greater than the time it takes drum 65 to make one revolution after which interval delay element 9–1 operates to switch the bi-stable flip-flop 9–2 to de-energize the switching input to 9–3 permitting said gate to open. A reproduction of the output of delay relay 9–1 is also used to actuate a solenoid 9–4 to step switch 63 to its next position.

In order to reproduce each command message recorded on magnetic drum 65 in its proper sequence (i.e. with the first portion of the message first reproduced and gated through 68) the beginning of said recorded message preferably contains a start signal which is different from the signals which follow such as of a time duration longer than any of the other pulse signals of the message. A relay circuit CR9–1 is provided operatively connected to the output of 66 and is responsive only to said long signal and when energized thereby effects the gating of the rest of the message to 68. Thus CR9–1 is effective to permit the reproduced command message to be passed to 68 in its proper sequence. CR9–1 comprises a delay element or relay 9–6 and a logical AND circuit 9–7 arranged so that a signal is generated on the output of 9–7 only after receipt of said reproduced longer duration start-of-message signal.

The output of AND circuit 9–7 is passed to a flip-flop circuit 9–9 which gates a signal to a coincidence detector or electronic gate 9–10 for closing said gate. The reproduced message following said start signal is thus passed to the input of stepping switch 68.

Each section of the command message or group of pulses which are to be transmitted to a respective control circuit such as P*r*MC*z* or P*r*CM*x* is separated by a synchronizing signal or pulse of longer time duration than any pulse in said section but shorter than said first mentioned lead signal. The synchronizing signal provided between pulse trains is passed to a delay relay 9–14 and a logical AND circuit 9–15 causing a control signal to be generated on the output of the latter which cannot be generated by other signal components of the message. Said signal generated at the output of 9-15 is passed to a solenoid 9-16 which is operative to step switch 68 to the next position.

In order to effect erasure of the signal just reproduced from 65 so that the recording track may be conditioned for the recording of another command message received after its reproduction, the output of delay means 9–8 may be passed to the relays RE–1 and RE–2. In FIG. 9' the output of delay element 9–8 is passed to a further delay element 9–11 and also simultaneously to an input to a flip-flop circuit 9–12 which thereafter gates a signal to a coincidence detector 9–13. The duration during which the delay means 9–11 generates an output signal is equal to at least the time it takes for drum 65 to make one revolution so that the output from 9–12 is generated long enough to gate a power supply PS through gate 9–13 and through switch 67 to the connected magnetic erase head EH for a period of time to completely erase all signals from the channel or track of said head (i.e. the channel from which said signal was just reproduced). The pulse output of 9–11 is passed to switch 9–12 to open and is also passed to the relay RE–1. RE–1 comprises a solenoid 9–6' which steps the output of 67 to the next position upon receipt of said pulse through a ratchet and pawl drive 67–RP driven thereby. Said next switching position of 67 provides a circuit between the erase signal PS and the erase head riding on the next recording channel to be reproduced from when 9–13 next receives its gating signal from 9–12.

Figures 10, 11, 12, 13:
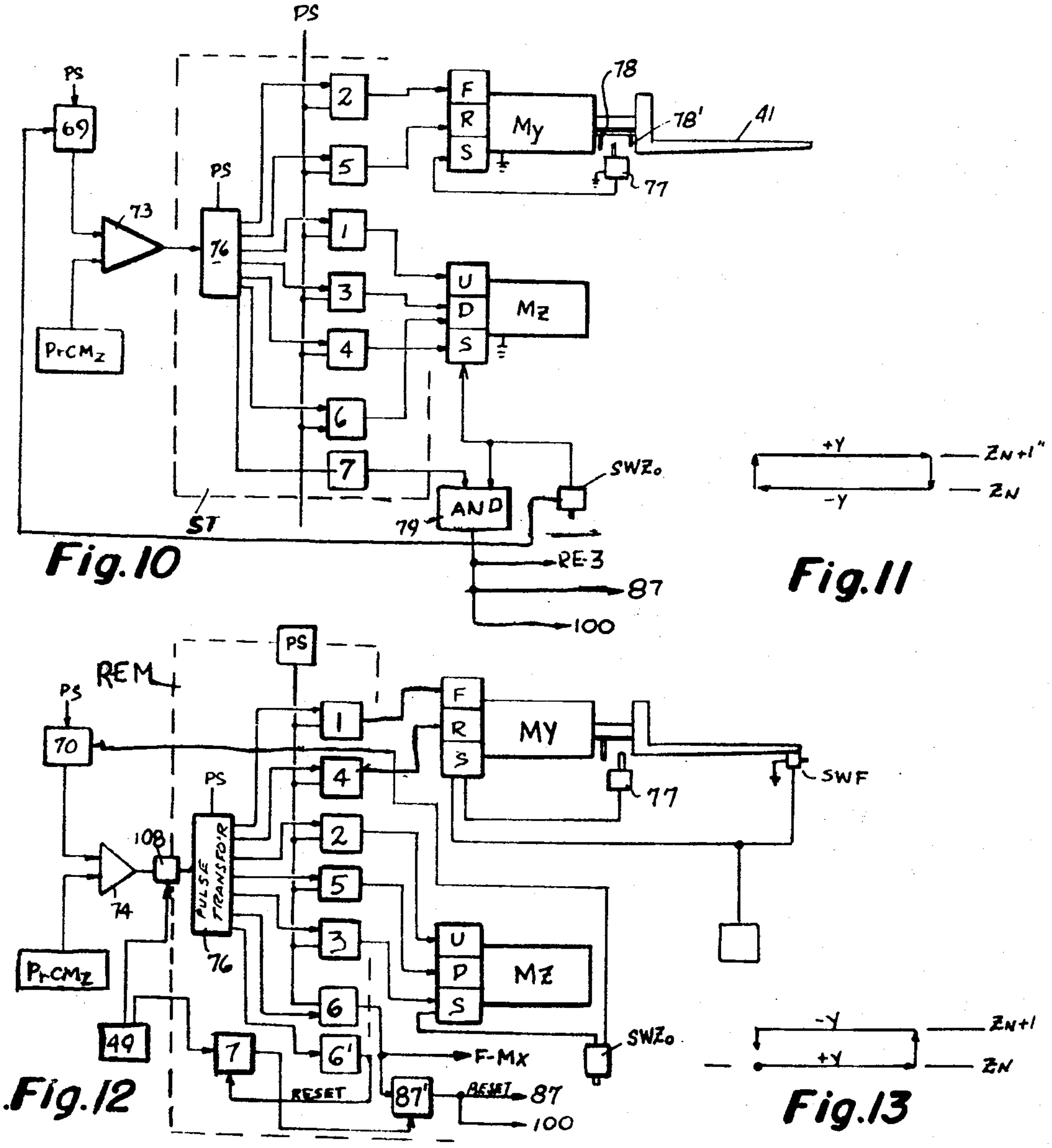
FIG. 10 is a diagram showing details of a sequential electrical controller which, when energized, effects movement of portions of the carrier of FIGS. 3 and 4 in the act of transferring a load to a storage position thereopposite.
FIG. 11 is a vector diagram illustrating the movement of the work holding fixture of the apparatus of FIGS. 3 and 4 when controlled by the electrical components of FIG. 10.
FIG. 12 is a diagram showing details of a sequential controller which when energized, effects movement of the carrier of FIGS. 3 and 4 to pick up a load positioned thereopposite.
FIG. 13 is a vector diagram illustrating the movement of the work holding fixture of the carrier apparatus of FIGS. 3 and 4 when controlled by the sequential controller of FIG. 12.

FIGS. 10 to 16 show further and more detailed aspects of the control means illustrated in FIG. 9. FIG. 10 illustrates one form of a sequential controller such as ST which effects, when energized by a pulse on its input, movement of the forks 41 in a path necessary to deposit a palletized load or tote box carried thereon from a position opposite a selected storage bay or rack position to a position where said pallet rests on the crossbars 23*b* of said racking. In the same control action, ST also effects the removal of said forks to a position clearing said racking. Fork movement is illustrated in FIG. 11 and comprises a first motion thereof to about an inch above the Z*n* position to position Z*n*–1. The control is next effective to cause inward motion of the forks to position the load thereon over the crossbars 23*b* and thereafter to effect the lowering of the forks to a degree such that the skids 26*a* of the pallet rest on the crossbars 23*b* with the forks dropping further to disengage and clear the bottom of the pallet. Final controlled movement comprises the retraction of the forks along path Y whereby the ends of said forks clear the front of the racking and said forks may be lowered to the Z*o* position.

In its simplest form, ST is a multi-circuit timer adapted when energized, to start and stop motors MY and MZ in a sequence to effect the above described motion. The multi-circuit timer ST may comprise a series of cams on a shaft driven by a servo motor which actuate and close at predetermined time intervals, normally open switches in circuit with the starting forward and reverse drive controls of MX and MY. In FIG. 10, controller ST comprises a series of limited time-elements or delay lines having notations 1 to 6 which are simultaneously energized and transmit at respective intervals thereafter and in a predetermined sequence, pulses to genergize the starting and stop controls of MY and MZ. The notation 76 refers to a single input transformer adapted when energized by a pulse from the AND switching element 73 to transmit pulses simultaneously to the multiple delay relays 1 to 7. A pulse is also transmitted from 76 directly to the control U of MZ. At a time interval thereafter sufficient to permit MZ to raise the carriage 37 and the forks the brief distance (Z+1), a pulse is transmitted from delay line 1 to S of MZ stopping the upward travel of said carriage at (Zn+1). The delay element next transmits a pulse to control F of MY causing the forks to be driven forward into the storage bay they are aligned with. A limit switch 77 energized by a pin 78 on the shaft of motor MY may be used to stop MY with the forks extended by transmitting a pulse to the stop control S of MY. After this occurs, the delay relay 3 transmits a pulse to control D of MZ causing the carriage and forks to be driven downward. Before the forks 41 touch the horizontal crossbars 23*b* of the racking, the delay relay 4 transmits a pulse to control S of MZ stopping said motor. A pulse thereafter from delay relay 5 transmitted to the control R of MY effects withdrawal of said forks and the limit switch 77, a double throw override toggle switch, becomes energized by the motion of the fork in reverse as it strikes pin 78' and transmits a second pulse to control S of MY stopping the reverse travel of said forks. The delay relay 6 then transmits a pulse to D of MZ causing the carriage 37 to be driven to the Z*o* position. When it reaches said position, the switch SWZ*o* becomes energized by the motion of the carriage 37 and transmits a pulse to control S of MZ and to AND switch 79. If a pulse is produced on the output 79, it is transmitted to the solenoid RE–3 which performs the mentioned function of stepping 66 to the next output to pass the next recorded command message to the control components illustrated in FIG. 9.

FIG. 12 illustrates details of the positional controller REM which effects the control of the motors MY and MX in a manner to move the forks 41 in a path from a position aligned with and near the bottom of a storage bay such as to place said forks under the pallet or load stored therein. Further operation of REM is effective in lifting the pallet from the surface on which is rests and in moving the forks to clear said storage racking. A transformer 76, when its input is energized by a pulse from either switch 49 to AND element 74, transmits simultaneously to a plurality of pulse delay elements or delay relays numbered 1 to 6. The notation 108 refers to a logical switching OR element at the output of switch 49 and AND element 74. The output of 108 is passed to 76. It is noted that the movement effected by controller REM may be required either when the carrier CA is adjacent the storage conveyor TS for pick-up of a load thereon for transfer to a predetermined storage bay, or when said carrier is in alignment with a selected storage position or bay in the act of removing a pallet therefrom for transfer to conveyor 25. Controller REM comprises a plurality of delay relays 1 to 6, each of which is adapted to transmit a pulse to a specific motor control at a different time interval after the inputs of all are energized by the simultaneous receipt of a pulse from 76. The delay relay 6, which is the last of the bank of relays to become activated, is effective in energizing the forward control F of MX, resetting the predetermining controller P*r*CM*x* and resetting controller P*r*CM*z*. It is noted that when the controller REM is used to effect the removal of a pallet from a temporary storage station TS, it is not desirable to reset P*r*CM*x* and P*r*CM*z* as these controllers must be utilized thereafter in controlling the further movement of the carrier CA and carriage 30 to position the palletized load in alignment with the selected storage bay. This is effected by providing the limit switch 49 which becomes actuated when CA moves over the temporary storage area TS, pin 50 actuates limit switch 49 which, when actuated, generates two pulses, one to the OR element 108 and the other to an unlimited TIME element which produces an output thereafter as a pulse transmitted to the switching input of a normally closed switch 87', thereby breaking the circuits between delay relay 6 and both the energizing input 87 of the positional controller P*r*CM*y* and the input 100 of predetermining counter controller P*r*CM*z*. This action prevents both P*r*CM*x* and P*r*CM*z* from being reset following the action of removing a pallet from the temporary storage platform TS yet permits the forward start control input F of motor MY to receive a pulse to effect movement of the carrier therefrom along track 22 towards the bay in which it is desired to store the load carried on the forks. Said controllers P*r*CM*x* and P*r*CM*z* may be reset however after the act of removing a palletized load from a storage bay for transfer to conveyor 25 as the output from AND circuit 74 does not effect element 7 and switch 87' remains closed. The output of unlimited TIME element 7 is cut off by passing a reproduction of the output pulse from another delay relay 6' to relay 7. The characteristic of an unlimited time element is such it will produce an output after an initial input until a second input thereto occurs. After transmission of the simultaneous pulses from 76 to the various delay relays the following actions occur in sequence. A first pulse is transmitted from delay line 1 to forward drive input F of motor MY driving the forks 41 when at the selected height towards the storage volume it is aligned with, which is a vertical position such that the forks will pass into said storage bay and clear both the rack cross bar **23*b* and the bottom 26*b* of the pallet. Limit switch 77, when actuated, stops the forward motion of the forks. Thereafter, a second delay relay 2 transmits a pulse to up-drive control U of motor MZ. The forks move upward and are stopped after they have engaged the bottom of the pallet and have lifted it off the surface on which it rests by a pulse from a third delay relay 3 passed to stop control S of motor MZ. A delay relay 4 next transmits a pulse to reverse drive control R of motor MY causing the forks to be retracted and switch 77 causes motor MY to stop when the forks 41 are fully retracted. The delay relay 5 thereafter transmits a pulse to control D of motor MZ which drives the carriage 37** downward and limit switch SWZ*o*, when actuated by movement of the carriage, stops the carriage at the Z*o* position. The delay relay 6 is actuated by a pulse transmitted thereto when the switch 49 becomes energized and is adapted to transmit a pulse to forward drive input F of motor MX at a time interval after the delay line 4 transmits a pulse to control R of motor MY equivalent to the time it takes for the forks to fully retract. It is noted that a pulse from either P*r*CM*z* or switch 49 may energize the sequential controller REM as the circuit from 49 by-passes the AND element 74. The forks are thus controlled to remove a palletized load from either temporary storage area TS or from a particular storage position in the racking 23 in the act of transferring it to the outgoing conveyor 25. FIG. 13 illustrates motion of the forks in action controlled by controller REM.

The notation SWF (FIG. 12) refers to a push-type, normally open limit switch which is mounted at the end of fork 41 with the actuator SWF' thereof projecting beyond said fork forward end. The switch is used to indicate when an object or obstruction is immediately in front of said forks so that damage is not inflicted on conveyor or the object contacted thereby. A condition may arise in the operation of the apparatus when an operator may make a mistake in dialing or otherwise controlling the action of the conveyor. The carrier is moved to store a load into a storage bay or to a position in which there is already something stored. Switch SWF is in circuit with a power supply and when so actuated by the forward motion of the forks 41 against an object, transmits pulses over two circuits, one to stop control S of MY and the other to an alarm device AL which may be a bell or light on a control panel. FIG. 12' illustrates the fork mounting of SWF which is protected by the sides and top of the fork blade in which it is mounted.

Figure 14:
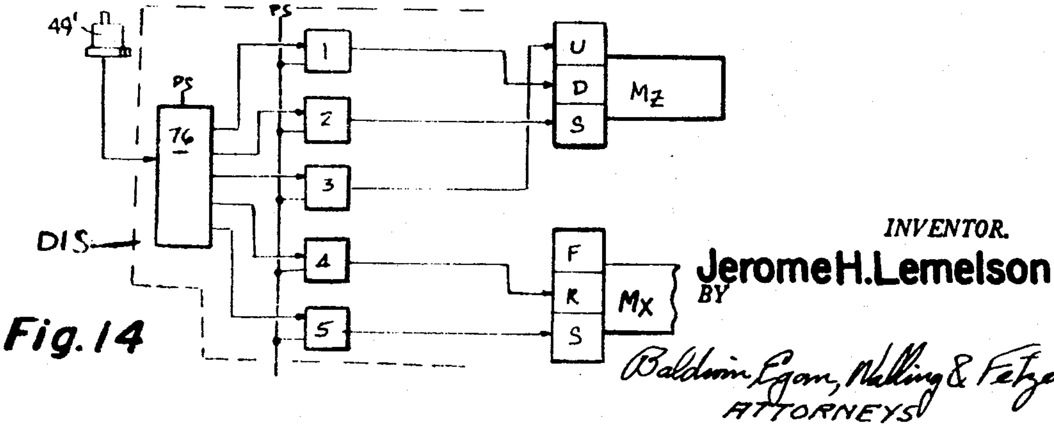
FIG. 14 is a diagram showing details of a sequential controller which when energized, effects movement of the carrier of FIGS. 3 and 4 in the act of discharging a load onto a belt conveyor.

FIG. 14 illustrates details of the controller DIS which is a sequential switching device capable of effecting movement of the conveying apparatus in a manner to effect the discharge of a pallet or load already on the forks, therefrom onto the conveyor 25 as illustrated in FIG. 8. The sequential switching action of DIS is initiated by a pulse from limit switch 49' which becomes actuated by a pin 50' projecting from conveyor track 22 when the carriage 30 moves to a position over 25. Upon becoming actuated, switch 49' transmits a pulse simultaneously to the stop control S of motor MX stopping the carrier CA over 25 with the forks 41 pointing in the direction of motion of said conveyor, and to the input of a pulse transformer which simultaneously transmits pulses over the multiple outputs illustrated to the time delay elements or relays 1 to 6. Thereafter these elements transmit control pulses at different time intervals to effect the following actions. A pulse 1 is transmitted to control D of motor MZ and shortly thereafter, one from 2 is transmitted to S of MZ. The time interval between these pulses is such that the forks are lowered sufficiently by the downward motion of the carriage 37 to permit the skids of the pallet to engage the conveyor belt 28 as illustrated in FIG. 8 and the forks 41 to travel a sufficient distance downward therefrom to the Z*o*–1 position whereby said forks disengage the bottom of said pallet. The next operated delay relay 3 transmits a pulse to control U of motor MZ a time delay after the pulse transmitted from 2, such that the load released from the forks will have completely cleared the forks in its travel down the conveyor 25. The next time delay pulse emitting relay to be energized is 3' which transmits a pulse to stop control S of motor MZ at a time interval whereby to stop the carriage at the Z*o* position. The delay relay 4 then transmits a pulse to control R of motor MX which drives the carrier CA along the track 22 away from the conveyor 25. The next time delay element to effect control is 5 which transmits a pulse to stop control S of motor MX at time interval after the carrier CA has been moved away from conveyor 25 so that it will not interfere with flow on said conveyor. This may be at a time when it is opposite the last tier or storage bays which are adjacent to 25 or when at a position midway between the conveyors 25 and 24. The finally actuated time delay relay is 6 which transmits a pulse, after the energization of relay 5, to the relay actuating solenoid RE–3 stepping the output of multi-circuit switch 66 to the next position whereby the next command control message is transmitted to the distributor 68.

Figure 15:
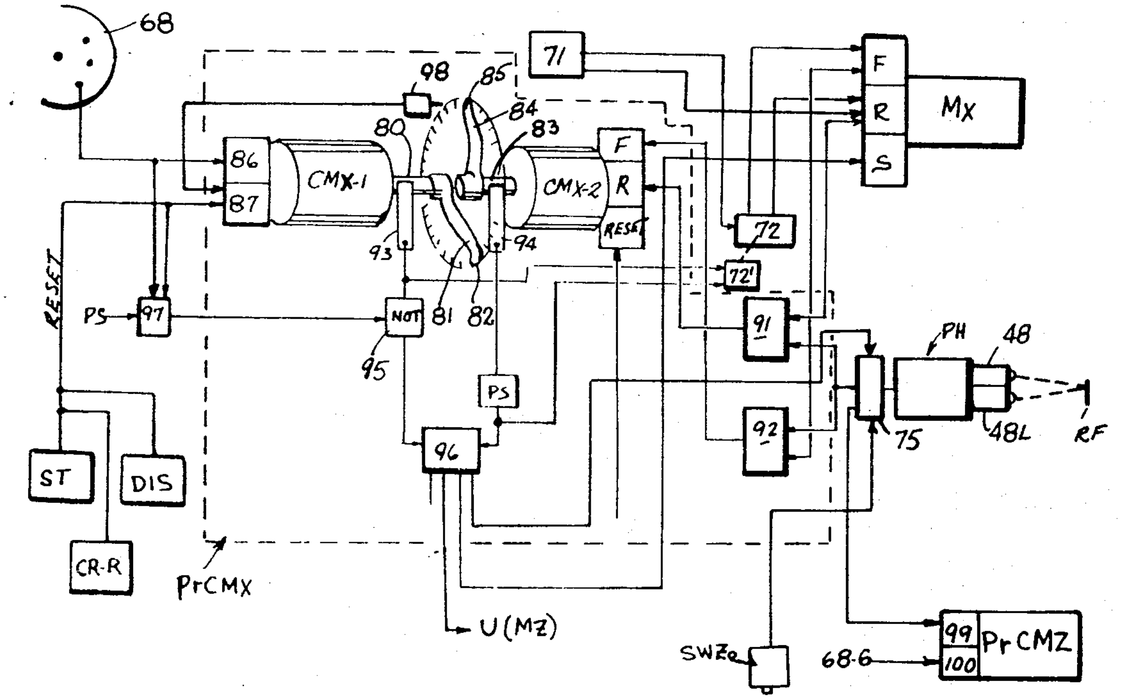
FIG. 15 is a diagram of a presettable predetermining controller for controlling the movement of the carrier of FIGS. 3 and 4 along its track.

FIG. 15 is a schematic diagram of the presettable positioning controller P*r*CM*x*. The diagram illustrates an electromechanical means for effecting X-directional positioning control by controlling the motor MX in accordance with a command input and utilizes the relative positions of two servo rotated shafts to respectively indicate the position of the carriage 30 along the track 22 and to control the motion of the carriage from any position in its realm of motion to any other selected or otherwise predetermined position therein. Since positional control is effected by pulse counting, controls utilizing static or electromechanical switching relays arranged as decade counting and switching devices may also be employed for positional control.

The basic components of the positioning controller illustrated in FIG. 15 comprise a first shaft positioner or stepping motor CMx–1, the shaft 80 of which is aligned with and adapted to rotate about the same axis as shaft 83 of a second shaft 80 positioned by a stepping servo CMx–2. Each shaft positioner is adapted to rotate its respective shaft a similar angular displacement with the receipt thereby of a discrete signal or pulse. Various pulse actuated shaft positioning mechanisms are known to the art. In their simplest forms, servos CMx–1 and CMx–2 are devices comprising a ratchet and pawl mechanism adapted to drive its shaft when actuated by a pulse operated solenoid with each pulse received, each pulse adapted to rotate the shaft a unit angular position.

A spring arm or brush 81 is secured to the end of shaft 80 and extends at right angles therefrom. A similarly shaped arm 84 is positioned on shaft 83 and is adapted to rotate therewith. Notation 82 refers to the end of arm 81 which is reduced in area and is adapted to make contact with and sweep over the end 85 of brush arm 84 when it crosses or is swept thereby.

By providing brushes 93 and 94 respectively riding on shafts 80 and 83, and a power supply P3 having terminals connected to each of said brushes, a circuit may be completed when the tip 82 of 81 touches or brushes by the tip 85 of arm 84 if said two shafts 80 and 83 and contactors 81 and 84 are made of current conducting material. The angular position of the shaft 83 is indicative of the position of the carriage 30 in its travel along track 22 whereas shaft 80 is stepped by part of the command message passed through 68 thereto, to an angular position which is an indication of the desired travel of the carrier CA along track 22 in the X direction. The shaft positioner CMz–2 is adapted to rotate arm 81 through any predetermined angle in equal stepped angular increments equivalent to the number of X bay locations from the homing position of the carrier to the selected bay location in which it is desired to store or remove a load, by discrete pulses gated through switch 68. This is accomplished by transmitting the correct number of pulses thereto from the reproduced command message. Another means for positioning shaft 80 a given rotation from a starting position is to include in the positional command message a signal of a time duration sufficient to drive a servo motor to rotate shaft 80 the desired angular degree. Since it is not desired to effect any control if the brush 81 sweeps past 84 while CMx–1 is being preset or prepositioned by the command message or signal, the first pulse from 68 to the input 86 of CMx–1 is reproduced and passed to slow-to-open, normally open switch 97 which is adapted to close or complete a circuit between a power supply PS and a logical NOT element 95. The NOT element 95, when so energized, prevents completion of the circuit including brushes 93 and 94 and the power supply PS while CMx–1 is being preset even though the contactor 81 may sweep past the contactor element 84. Switch 97 is sufficiently slow-to-open the circuit such that shaft 80 may be stepped or driven through a complete sweep of its orbit at the stepping rate controlled by the command message before it opens. When the power input to the NOT element 95 ceases, the switch closes and the circuit thereafter will be completed whenever tip 82 contacts tip 85. The shaft 83 is caused to step a predetermined degree each time it receives a pulse from the photoelectric scanning device PH and hence indicates relative movement of the carrier CA. When tip 82 contacts tip 85, the carrier 30 is at the selected X position and further control is effected by means of a pulse transformer 96, in series circuit with 93, 80, 81, 84, 83, 94, PS, which transformer produces control pulses over multiple output circuits. One of said output pulses is transmitted to stop control S of motor MX which stops the carrier CA in alignment with the X location of the selected storage position. Another pulse is transmitted to control U of motor MZ causing the carriage 37 to begin its upward travel on carrier track 34. Another pulse is transmitted from 96 to a solenoid actuated double throw switch 75 to switch the output of photoelectric scanner PH from the input to CMx–2 to the input of controller PrCMz.

Each command control cycle terminates upon the driving of carriage 37 to the bottom of the track 34 when it stops at the Zo position where it remains until it is driven by the next control action. The next control cycle may be, for example, movement of the carriage 30 in either X direction towards a selected storage bay for the removal therefrom of a palletized load to be carried to the conveyor 25. Since this will require either forward or reverse drive of the carriage drive servo MX, a control means, utilizing the relative positions of arms 81 and 84, is provided to actuate either the forward drive control F of motor MX or the reverse control R thereof at the start of the control cycle. The notation 72 refers to an electromechanical flip-flop switch and 72′ to a pulse energized solenoid actuating said switch 72 to effect such selective control. Solenoid 72′ is in circuit with power supply PS and brushes 93 and 94 which circuit by-passes the NOT element 95 providing a pulse to energize the solenoid 72′ every time contactor 82 engages 85. Thus the condition of the switch 72 is indicative of the angular position of the arm 81 relative to arm 84. If 84, for example, is to the counterclockwise side of 81 and the clockwise motion of 81 from a zero or starting position is an indication of travel of the carrier CA to a selected bay away from conveyor 24, then it will be necessary to energize the forward F control of MX. Said switch 72 is thus in a condition to pass a signal through 71 to forward drive control F of motor MX. If, however, arm 81 is positioned by the command message on the counterclockwise side of 84, the switch 72 will be in its other bi-stable state and the switching pulse from 71 will be passed to control R of motor MX effecting the driving of the carrier CA in the direction towards conveyor 24. A control means is also provided for effecting the correct direction of rotation of shaft 83 by means of two logical AND elements 91 and 92 each having an input from the common output of scanner PH. A second input to the AND element 91 is provided from control R of motor MX whereby power is shunted to 91 whenever R is energized. A second input to 92 is provided through control F of motor MX which provides a continuous signal thereto whenever control F of motor MX is energized. The output of 92 is passed to an input 88 of CMx–2 which is a solenoid which effects the drive of shaft 83 in the other direction in incremental amounts each time a pulse is generated by scanner PH. Thus, depending on which of the AND elements 91 or 92 has its input energized, CMx–2 will be incremently stepped either clockwise or counterclockwise a unit angle each time a pulse is emitted from PH.

The notation 87 refers to a servo adapted to reset the shaft 80 to a zero position upon receipt of a pulse from either the controllers ST or DIS at the end of each control cycle. The input to 87 is also connected from the output of relay CR–R which is a coded relay connected to the output of the receiver 62 which is adapted to pass a pulse to resetting servo 87 upon the receipt of a coded signal generated by the operator by operation of dial switch PrS in the event that an error has been made in keying or entering the command control message. The control 87 may be a servo motor adapted to start upon the receipt of a pulse signal and continue to drive shaft 80 counterclockwise to the reset position and shut off upon attaining said position. Notation 98 refers to a limit switch at said zero position actuated by the arm 81 and adapted when actuated thereby to transmit a pulse to the stop control of 87. It is noted that the reset position of arm 81 is counterclockwise of arm 84 so that a pulse will be transmitted to 72′ if 84 happens to be at said reset position when 85 is driven clockwise to a selected position.

Figure 16:
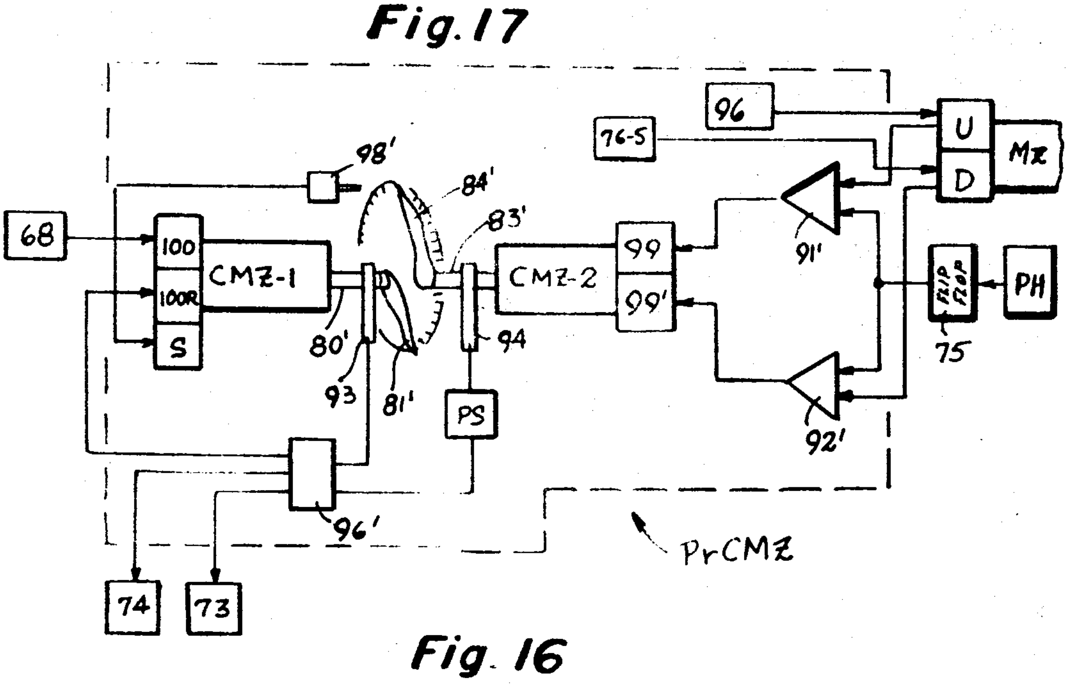
FIG. 16 is a diagram of a presettable, predetermining controller for controlling the vertical movement of the work-holding fixture of the carrier of FIGS. 3 and 4 and prepositioning said fixture at a predetermined height for either picking up work in storage at said height or depositing work held thereby on the storage rack at said height.

FIG. 16 shows the controller PrCmz in the block diagram. PrCmz functions similarly to the controller PrCmx and consists of two stepping servos, CMz–1 and CMz–2, each having a respective aligned shaft referred to by the notations 80′ and 83′ on the ends of which are mounted blades 81′ and 84′ which are adapted to complete a circuit as described upon contacting each other when the angles of said shafts are equally rotated from a zero position. The shaft 80′ is positioned upon the receipt by stepping motor CMz–1 of a specific number of pulses gated thereto from said reproduced command control message which is passed thereto through the output 2 of 68. The shaft 83′ is at its zero position when the carriage 37 is at the lowermost position in its travel. The servo CMz–2 which is operated to step clockwise by a solenoid and ratchet-pawl drive 99 and counterclockwise by a similar drive 99′, receives its input from the photoelectric control PHC only when the carriage 37 is travelling up and down track 34. This is effected by gating the output of photoelectric scanner PHC to the described switch 75 through one of two AND switching circuits 91′ and 92′. The other inputs of these AND circuits are respectively connected to the U and D controls of motor MZ so that a continuous signal is transmitted to 91′ if MZ is operating to drive carriage 37 upward whereas a signal appears at AND elements 92′ if D of MZ has been actuated and motor MZ is driving carriage 37 downward. Thus the output of 75 is passed to either 98 or 99′ depending on which AND elements has been energized and the shaft 83′ steps a position either clockwise or counterclockwise with each pulse received. When 84′ sweeps across 81′, a circuit is completed with a power suply PS causing a relay 96′ to become energized which transmits an output pulse over three circuits, one to 73, another to 74 and a third to an input to a servo 100R which drives CMz–1 to a reset position where the arm 81′ actuates a limit switch 98′ which stops 100R with said arm at a reset position. Shaft 81′ is stepped to zero when the carriage 37 travels to the Z*o* position.

Figure 17:
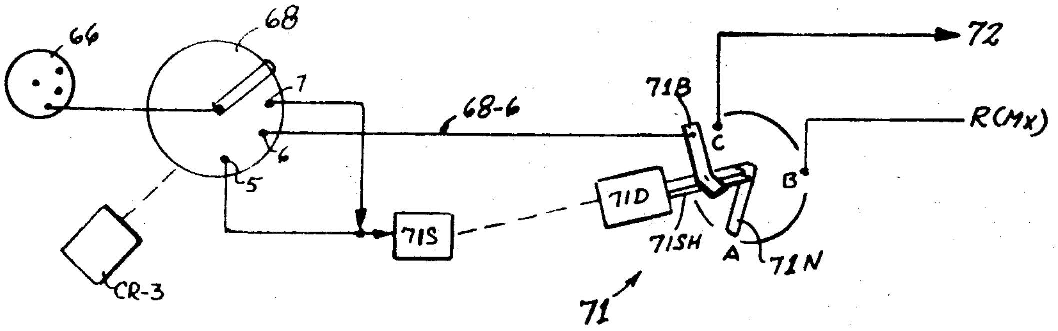
FIG. 17 is a diagram showing components of a typical code operated gate employed in the control system.

Details of one design for a coded relay such as 71 are shown in FIG. 17. Said switch is a three position, solenoid operated self-resetting device. In FIG. 17, the switch is open when arm 71N is at position A. When at position B, a circuit is completed betwen input 68–6 and control R of motor MX. When arm 71SW is at position C, a circuit is completed with switch 72. A pulse actuated solenoid 71S drives a rotary shaft 71SH through a ratchet and pawl mechanism 71D. The output of position 6 of switch 68 passes through brush 71B riding on shaft 71SH through contactor arm 71SW and to the respective output circuit depending on which contact, B or C, 71SW engages. The shaft 71SH is stepped one third of a revolution each time the actuating solenoid 71S is energized. 71S is energized to step its shaft to either position B or C from the open position A by the receipt of either one or two pulses derived from the command message passed through output 5 of switch 68. 71SW is rotated, it has gated a pulse to either 71 or R–MX, to open position A by a signal passed through the 7 output position of switch 68 thereto.

It will be apparent that the conveyor and storage area arrangement illustrated in FIGS. 1 and 2, as well as the design of the particular work handling carrier are subject to various modifications without departing from the spirit of the invention. The horizontal in-flow and outgoing conveyors may be of any suitable type and may be positioned for travel between rows of storage racking or in any suitable direction and similarly, the exact electrical, scanning, recording and predetermining control means may be subject to include any suitable arrangement as indicatetd, for example, hereinabove and in the said above mentioned copending application.

Figure 18:
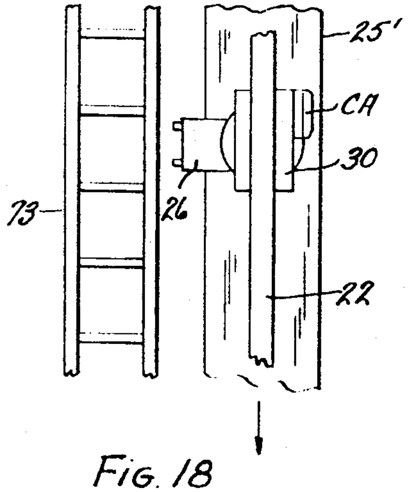
FIG. 18 is a plan view of part of a modified article transfer showing a track traveling carrier removing an article from storage.
Figure 19:
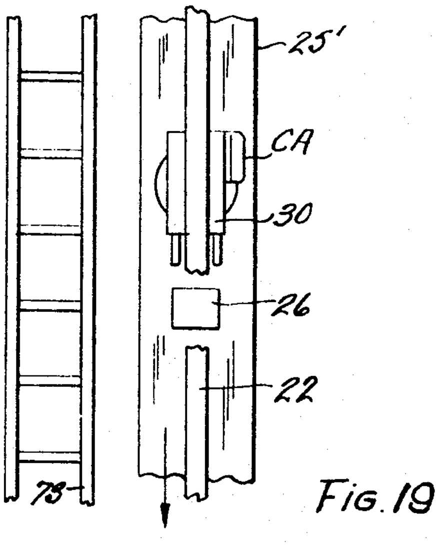
Figure 20:
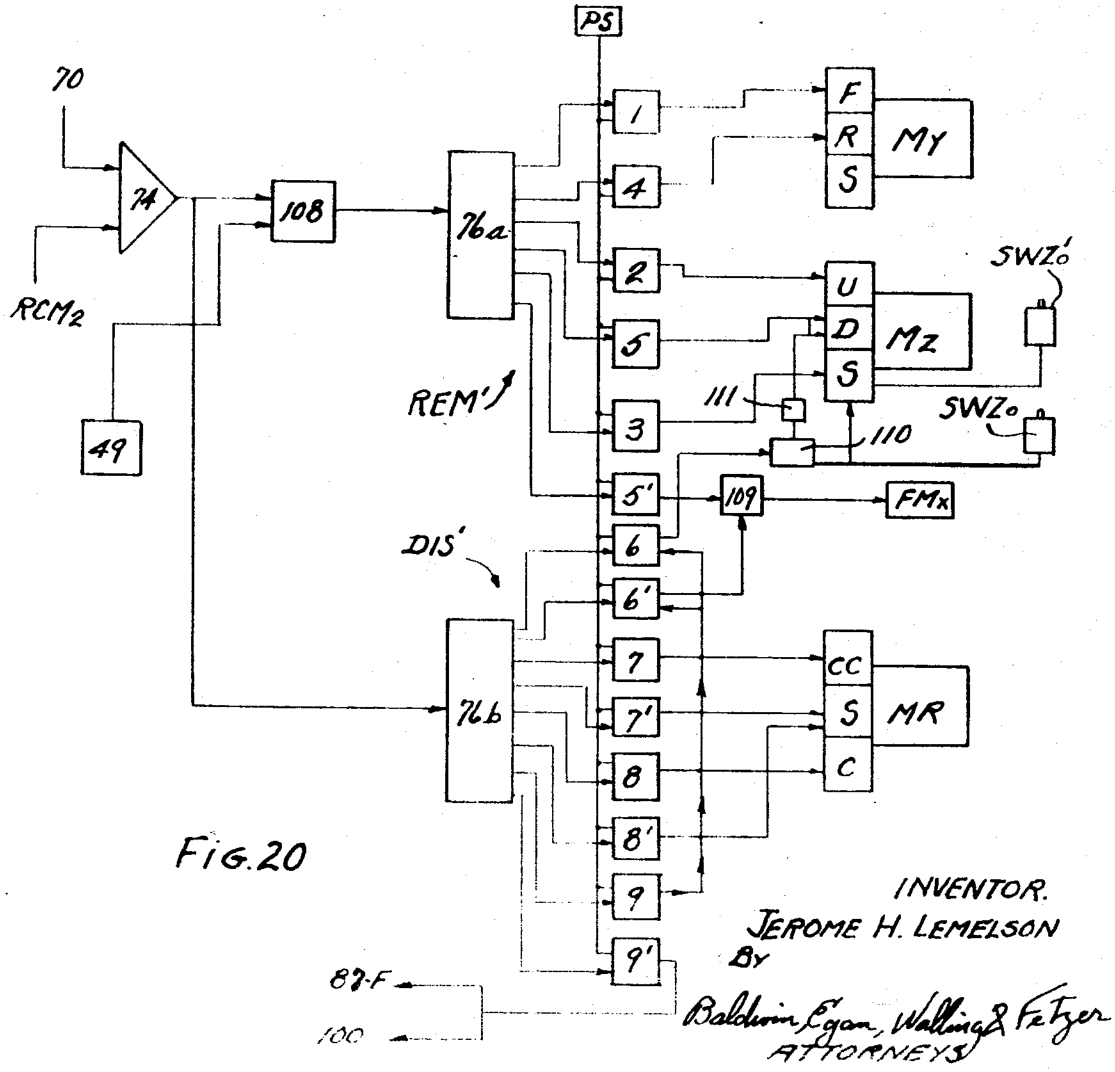
FIG. 20 is a diagram of automatic control apparatus forming part of the system control of FIG. 9 and operative to effect the movement of the transfer apparatus of FIGS. 18 and 19 as shown and described therefor.

FIGS. 18 to 20 illustrate the described automatic conveying apparatus modified to provide a storage system utilizing one or more out-flow conveyors 25′ which run essentially parallel to the carrier track 22 and the face of the storage racking 23. The system has the characteristic that the carrier CA need not be driven to the end of its track each time it is desired to transfer a palletized load from storage to the out-flow conveyor. FIG. 18 is a plan view showing the basic arrangement of conveying and storage components of such a system whereby said storage racking 23 is positioned adjacent to an overhead track 22 running parallel thereto and a continuously moving belt conveyor 25′ also running parallel to 23 and preferably directly under the track 22′. The conveyor 25′ may be replaced by a gravity chute or roller conveyor. In FIG. 18, a load 26 has just been removed from the rack storage position opposite the carrier and the forks have been retracted with the load thereon. In order to transfer the load to the outflow conveyor 25′ the forks 41 merely have to be rotated 90° in the direction of flow of the conveyor 25′ and the load lowered as in FIG. 8 until the skids of the pallet or tote box rest on the conveyor. In the described manner, the forks may be held for a brief period at the Z*o*–1 position over the conveyor 25′ while the load is carried downstream on said conveyor and clears the forks as in FIG. 19. The carrier CA may then continue under the control of the next command code or message.

The above actions require that means be provided for rotating the assembly 34 below the carriage 30 and this is effected as shown in FIGS. 3 and 4 by means of motor MR mounted on the carriage 30 which may be used to rotate the pivotally mounted assembly 34 through gears G1 and G2. Automatic control of this movement may be attained by a modification of the command controller DIS to include control of the motor MR in rotating 34 through the desired 90° angle and returning it to its prerotated position a time interval after the forks have reached the Z*o*–1 position to permit the load to clear said forks as it travels down the conveyor 25′.

FIG. 20 is a schematic diagram illustrating means for effecting control of the movement of the forks 41 in the act of removing a load 26 from a selected storage bay and in transferring it to the conveyor 25′ as illustrated in FIGS. 18 and 19. Modified sequential switching controllers REM′ and DIS′ replace the controllers REM and DIS of FIGS. 12 and 14 to effect this action. Here again, the action of REM′ which effects the described motion of the forks 41 in the act of advancing, lifting and removing a load or pallet from an at-rest position thereopposite may be initiated by a pulse from either the limit switch 49 or the logical AND element 74 which becomes energized by an input from 70 and PrCMz. The outputs of both 74 and 49 pass to a logical switching OR element or circuit so that either may be passed to a transformer, junction or multi-output relay 76 which transmits pulses to and energizes delay relays 1, 2, 3, 4, 5 and 5′. A second transformer or **76*b* is used to energize the delay relays 6, 6′, 7, 7′, 8, 8′, 9 and 9′. The delay lines controlled by 76*b* control the movements in which the load is lowered to the level of the conveyor 25′ after being rotated 90° so that the forks face in the direction of travel of said conveyor a degree such that the load may be carried off the forks, as described, and illustrated in FIG. 8. Transformer 76*b* is adapted to receive an input signal only from the output of AND element 74 so that the action controlled thereby will be initiated only in removing a palletized load from a selected position in the racking 23 and will not occur after a load is removed from its at-rest position on the platform or conveyor TS. The sequential actions controlled by the delay relays 1, 2, 4, 5, and 3 are similar to those controlled by the similarly numbered delay elements of FIG. 12. This action comprises the motion of the forks forward to a position under the load, the lifting of the load thereby and its removal to clear the racking or the front of TS. A delay line 5′ is utilized to transmit a pulse through a normally closed switch 109 to the forward starting control F of MX. This pulse is permitted to pass through 109 to F–MX only when the forks are opposite TS by providing solenoid means to energize the switch 109 to its "open" position and a signal thereto to effect its opening when 76*b* becomes energized or receives a signal from 74. The numeral 6 refers to an unlimited TIME function or circuit which becomes energized immediately upon receipt of a pulse from 76*b* and passes a prolonged signal to 109 actuating it to "open" as long as said signal is present. A second unlimited TIME function 6′ becomes energized by a pulse from 76*b* at the same time delay element 6 becomes energized and passes a prolonged signal to one input of an AND element or circuit 110. The delay relay 7 is of such a time duration that it becomes energized and transmits a pulse over an output a time interval after the delay relay 4 transmits a pulse to reverse control R of MY such that MY has had time to completely retract the forks 47 to a position where they have cleared the racking and the forks may be rotated through said 90° without striking said racking. The pulse from 7 is transmitted to a control CC of motor MR which starts said motor in a manner to rotate the assembly 34 and forks 41 as illustrated in FIGS. 18 and 19 (i.e. counterclockwise). A relay relay 7′ next transmits a pulse to the stop control S of MR stopping said motor and rotation of the assembly 34. The pulse is transmitted from 7′ to S–MR at a time interval after the transmission of the pulse from 7 to CC such that the assembly will have rotated 90° from its original position when it stops. A limit switch mounted on the assembly 34 which strikes a pin projecting from the bottom of 30 may also be used to stop the rotation of 34 after 90° of rotation by stopping or braking MR at the proper interval and in the conventional manner and is illustrated in my prior application. The delay relay 8 next transmits a pulse to energize a control C–MR which starts MR in reverse rotating the forks 41 90° back to their position perpendicular to the face of the racking. This action occurs only after a sufficient time interval to permit the forks to be lowered a degree whereby the skids of the pallet or box engage the top of conveyor 25′ and to be carried thereby to clear the forks as shown by broken lines in FIG. 8. The driving of the forks 41** to the (Z*o*–1) position during the time interval between the output from elements 7′ and 8 is effected as follows. The limit switch SWZ*o* transmits a pulse when the carriage 37 reaches the Z*o* position and energizes or actuates SWZ*o* to S–MX and said AND circuit 110 which already has its other input energized or charged by the prolonged signal from the unlimited TIME function 6. A pulse is thus transmitted from the output of AND circuit 110 to downward drive control D–MZ driving the carriage 37 downward to the (Z*o*–1) level and a second limit switch SWZ*o*′ mounted on the assembly 34 below SWZ*o* becomes actuated by the carriage 37 striking thereagainst and transmits a pulse to S–MZ stopping said carriage at its (Z*o*–1) position. The notation 111 refers to a delay line of short duration in the circuit of 110 and D–MZ which is utilized to prevent the pulses passed to D–MZ and S–MZ from SWZ*o* from arriving at each circuit simultaneously. It is noted that the time interval between the pulses transmitted from the delay lines 5 and 8 of FIG. 20 is such that the carriage 37 will have sufficient time to travel from the topmost position in its vertical travel to the Z*o*–1 position and includes the time required for the load 26 to be carried by the conveyor 25′ off the forks. The action of discharging the load from any Z position will require the same time if the method of control of FIG. 20 is utilized. It is noted that a limit switch with a long contact arm mounted on and projecting from the bottom of 37 (i.e. switch SWS of FIG. 8) may be utilized to energize the delay element 8 by transmitting a pulse thereto, when 37 has reached the (Z*o*–1) position, as it strikes 25′. The delay line 8′ next transmits a pulse to the stop control S of MR at a time interval after the energizing of C–MR such that the carriage 37 and forks 41 will be facing the racking 23 with said forks aligned perpendicular thereto. If switch SWZ*o* is utilized for control, the delay line 9 may also be energized by a pulse therefrom rather than from **76*b*. The use of the limit switch SWS to energize the delay lines 8 and 8′ will assure that the action controlled thereby (i.e. rotation of the forks back to their position perpendicular to the racking 23) will occur during every cycle just after the palletized load had been carried off and clears said forks by the action of 25′. Still another delay line 9 is provided with a time constant such that it transmits a pulse to the unlimited TIME circuits or flip-flops 6 and 6′ to cut-off or stop their output signals to the devices 109 and 110**. This may occur at any time interval after SWZ*o* becomes actuated and may also be controlled by the action of the limit switch SWZ*o* (i.e. SWZ*o* may be a multipole, normally open single throw switch adapted to transmit pulses to and energize the delay relays 8, 8′ and a pulse directly to 6 and to 6′). The numeral 9′ refers to still another delay line having an input from **76*b*. The delay 9′ transmits a pulse to 87F and one to 100** to reset P*r*CM*x* and P*r*CM*z* respectively, after receiving an input pulse from **76*b*. In FIG. 20, the carriage 37** remains stopped at the Z*o*–1 position although it may be raised to the Z*o* or any desired Z position, while awaiting controlled operation by another command message or signal by the provision of two or more additional delay lines to provide pulses thereafter to U–MZ and S–MZ.

A modification to the product transfer and discharge arrangement provided in FIGS. 18 to 20 may be effected in which the possibility that the conveyor 25′, above which the transfer device CA operates and onto which it discharges articles or pallets, will not contain a product or load which will engage part of the carrier CA and be deflected thereby or interfere with its operation. If conveyor 25′ extends along the aisle serviced by the carrier CA which is the only carrier positioned over said conveyor, then interference between the carrier and pallets on the conveyor may be eliminated if the carrier is controlled to move at the same or slower speed than the velocity of the continuously moving conveyor. In other words, the carrier cannot overtake a pallet discharged by it onto the conveyor. However, photoelectric or other proximity detection means mounted at the lower end of the carrier CA may be used to prevent its contact or interference with articles moving along 25′. The limit switch SWS illustrated in FIG. 8 or an arrangement of a plurality of such switches having arms protruding in several directions from the carriage or vertical columns 34 may serve such purpose by either preventing movement of the carriage or carrier or effecting control of the proper servo motor to immediately effect the withdrawal of the carrier from the vicinity of the continuously moving belt conveyor.

The conveyor 25′ may also be replaced by a chute or gravity roller conveyor disposed parallel to at least part of the racking and having a discharge end position for feeding articles placed thereon by the transfer device CA onto the main outflow conveyor 25. The outflow conveyor may be sloped toward the side adjacent the end of the gravity or belt conveyor 25′ so that articles discharged thereon by 25′ will slide to the other side of 25 thus substantially reducing the possibility of two or more products interfering with each other such as when one is discharged onto a portion of belt conveyor already occupied by another.

As hereinabove suggested, the automatic warehousing apparatus provided in FIGS. 1 to 20 may be modified to permit the storage of a plurality of articles or pallets which may be individually removed from storage by means of the transfer device or carrier servicing one side of the racking. In the embodiment illustrated in FIGS. 1 and 2, for example, one or more of the racks or longitudinal arrays of racking 23 may define means for supporting a plurality of gravity chutes or gravity roller conveyors each replacing a particular storage bay. If means are provided at the end of each gravity conveyor or chute for preventing the flow of articles or pallets, delivered to the other end of the conveyor, off said conveyors yet designed so as to permit the articles to be individually lifted from the bay location by said movement of the carrier forks, then the storage capacity per carrier may be greatly increased. In other words, an elongated gravity storage conveyor positioned within each storage location 23 of the racking which conveyor terminates facing an aisle serviced by one of the carriers or transport devices with the loading end of the conveyor disposed facing the adjacent aisle, may be used to store a plurality of similar products which may be automatically placed in storage by one carrier servicing the loading end of the conveyor and removed from storage by another carrier servicing the discharge end of the conveyor. If the vertically extending fixture or track 34 of each carrier is rotatable at least 180 degrees, each carrier may serve the dual functions of removing articles from the discharge ends of the storage rack gravity conveyors and placing articles or pallets into storage by servicing the receiving ends of the gravity conveyors located on the other side of the aisle serviced thereby.

In such a storage arrangement, the gravity conveyors or chutes will necessarily be disposed so as to deliver the article or pallet behind that removed from the end of the conveyor to the discharge end thereof so that it may be next removable therefrom.

It is to be understood that the above described arrangements are illustrative of the application of the principles of the invention. Numerous other arrangements may be devised by those skilled in the art without departing from the spirit and scope of the invention.

What is claimed is:

1. An automatic storage apparatus comprising:

(a) a storage frame having means defining a plurality of storage volumes arranged in vertical and horizontal rows, and having open ends disposed in a generally vertical plane and adapted to receive loads therein, (b) means defining a load pickup station spaced horizontally from said storage frame, (c) a load carrier movable from said station to a selected one of said storage volumes for picking up or depositing a load thereat, said load carrier including a carriage movable substantially horizontally past the plane of the open ends of said storage volumes, generally vertical mast structure supported by said carriage and extending therefrom, a substantially vertically movable elevator guided by said mast structure, and a substantially horizontally extendable and retractable cantilever mounted load handling fixture supported by said elevator and being movable into and out of said storage volumes, (c′) guide means for said load carrier, (d) electrical power means for actuating said carraige, said elevator and said fixture, (e) control means for actuating said power means, said control means including message generating means operable upon predetermined actuation of said control means to cause said carrier to move sequentially to two selected storage volumes in execution of a first command, wherein a load is moved from said station to a first selected storage volume, and in execution of a second command without further actuation of said message generating means, wherein said load carrier moves to a second selected storage volume and picks up a load, said control means effecting a series of movements whereby said carriage is moved to the horizontal position of a selected storage volume and said elevator is moved to the general level of the selected storage volume and said fixture is reciprocated laterally in a transfer movement to transfer a load between the fixture and the selected storage volume, (f) said control means including a first sequence control effecting an unloading movement whereby said fixture enters said selected storage volume in a high position and is lowered to deposit a load therein and said control means including a second sequence control effecting a loading movement wherein said fixture enters said selected storage volume in a low position and is raised to pickup a load therefrom, said fixture being so mounted with respect to said elevator that said fixture is disposed in spaced relationship to the defining storage frame means of the selected storage volume during movement of the load support fixture into and out of the selected storage volume for respectively depositing a load into or removing a load from the selected storage volume, (g) and said control means including means selecting said first sequence control for activation at said first selected storage volume and said second sequence control for activation at said second selected storage volume.

2. An automatic storage apparatus comprising:

(a) a storage frame having a generally vertical face and means defining a plurality of storage volumes opening at said face, (a′) means defining a load pickup station horizontally spaced from said storage frame, (b) a load carrier disposed alongside said face and movable parallel with said face for transporting loads to and from said storage volumes, (b′) guide means for said load carrier, (c) said load carrier including a carriage movable substantially horizontally past said face, generally vertical substantially rigid mast structure supported by said carriage and extending therefrom, a substantially vertically movable elevator guided by said mast structure and a substantially horizontally extendable and retractable cantilever mounted load handling fixture supported by said elevator and being movable into and out of said storage volumes, (d) servo drive means for driving said carriage and said elevator, (e) power means for projecting and retracting said fixture with respect to said elevator,, (f) control apparatus, (g) said control apparatus including a positional control means operatively connected to said servo drive means, (g′) position indicating means located on said storage frame and said guide means, (h) said positional control means having means for sensing said indicating means and being operable to deactivate said servo drive means when said fixture is aligned with a selected storage volume, (i) said control apparatus also including a first sequential control means operative for controlling said servo drive means and said power means for the transfer of a load from said carrier into a selected storage volume, said first sequential control means effecting an unloading movement whereby said fixture enters a selected storage volume in a high position and is lowered to deposit a load therein, (j) said control apparatus also including a second sequential control means operative for controlling said servo drive means and said power means to effect movement of said carrier for the transfer of a load from a selected storage volume to said fixture, said second sequential control means effecting a loading movement whereby said fixture enters said selected storage volume in a low position and is raised to pick up a load therefrom, (k) said fixture being so mounted with respect to said elevator that the fixture is disposed in spaced relationship to the defining storage frame elements of the selected storage volume during movement of said load supporting fixture into and out of the selected storage volume for respectively depositing a load into or removing a load from the selected storage volume,
(l) means for actuating said first sequential control means when said fixture is in alignment with a selected storage volume,
(m) means for actuating said second sequential control means when said fixture is in alignment with a selected storage volume,
(n) and said control apparatus including means for actuating said positional control means to effect movement of said fixture to a second selected storage volume, after said first sequential control means has been actuated at a first selected volume, and causing actuation of said second sequential control means when said fixture is positioned at said second storage volume.

3. An automatic storage apparatus comprising:
(a) a storage frame having a generally vertical face and means defining a plurality of storage volumes opening at said face,
(a') means defining a load pickup station horizontally spaced from said storage frame,
(b) a load carrier disposed alongside said face and movable parallel with said face for transporting loads to and from said storage volumes,
(b') guide means for said load carrier,
(c) said load carrier including a generally horizontally movable carriage movable past said face, generally vertically extending substantially rigid mast structure supported by said carriage and extending therefrom, a vertically movable elevator guided by said mast structure, and a laterally movable cantilever mounted load handling fixture carried by said elevator and movable generally horizontally into and from said storage volumes for transferring loads between the load carrier and the storage rack,
(d) servo drive means for driving said carriage and said elevator,
(e) power means for projecting and retracting said fixture with respect to said elevator,
(f) control apparatus,
(f') position indicating means located on said storage means and said guide means,
(g) said control apparatus including a positional control means for sensing said indicating means, and operatively connected to said servo drive means,
(h) said positional control means having means to deactivate said servo drive means when said fixture is aligned with a selected storage volume,
(i) said control apparatus also including a first sequential control means operative for controlling said servo drive means and said power means for the transfer of an article from said carrier into a selected storage volume, said first sequential control means effecting an unloading movement whereby said fixture enters said selected storage volume in a high position and is lowered to deposit a load therein,
(j) said control apparatus also including a second sequential control means operative for controlling said servo drive means and said power means to effect movement of said fixture for the transfer of an article from a selected storage volume to said fixture, said second sequential control means effecting a loading movement whereby said fixture enters said selected storage volume in a low position and is raised to pick up a load,
(k) said fixture being so mounted with respect to said elevator that said fixture is disposed in spaced relationship to the defining storage frame elements of the selected storage volume during movement of said fixture into and out of a selected storage volume for respectively depositing a load into or removing a load from a selected storage volume,
(l) means for actuating said first sequential control means when said fixture is in alignment with a selected storage volume,
(m) means for actuating said second sequential control means when said fixture is in alignment with a selected storage volume,
(n) said carrier including means for moving said elevator and supported fixture vertically between lowermost and uppermost positions on said mast structure,
(o) and said control apparatus including means for actuating said positional control means to effect movement of said elevator and fixture to said lowermost position after said first sequential control means has been actuated at a first selected storage volume and causing movement of said elevator and fixture thereafter to a second selected storage volume and actuation of said second sequential control means when said fixture is positioned at said second selected storage volume.

References Cited

UNITED STATES PATENTS

| | | | |
|---|---|---|---|
| 2,691,448 | 10/1954 | Lontz | 214—161.1 |
| 2,707,666 | 5/1955 | Becker | 214—16.1 |
| 2,847,131 | 8/1958 | Miller | 214—16.4 |
| 3,049,247 | 8/1962 | Lemelson | 214—16.4 |
| 3,119,501 | 1/1964 | Lemelson | 214—16.4 |
| 2,988,237 | 6/1961 | Devol | 214—16.4 |

FOREIGN PATENTS 154,013 9/1951 Australia.

GERALD M. FORLENZA, Primary Examiner
R. B. JOHNSON, Assistant Examiner